(12) United States Patent
Kadota et al.

(10) Patent No.: US 8,309,678 B2
(45) Date of Patent: Nov. 13, 2012

(54) AROMATIC COMPOUND AND POLYARYLENE COPOLYMER HAVING NITROGEN-CONTAINING HETEROCYCLE INCLUDING SULFONIC ACID GROUP IN SIDE CHAIN

(75) Inventors: Toshiaki Kadota, Chuo-ku (JP); Yoshitaka Yamakawa, Chuo-ku (JP)

(73) Assignee: JSR Corporation, Tokyo (JP)

( * ) Notice: Subject to any disclaimer, the term of this patent is extended or adjusted under 35 U.S.C. 154(b) by 256 days.

(21) Appl. No.: 12/600,742

(22) PCT Filed: May 16, 2008

(86) PCT No.: PCT/JP2008/059053
§ 371 (c)(1),
(2), (4) Date: Nov. 18, 2009

(87) PCT Pub. No.: WO2008/143179
PCT Pub. Date: Nov. 27, 2008

(65) Prior Publication Data
US 2010/0152308 A1    Jun. 17, 2010

(30) Foreign Application Priority Data
May 18, 2007    (JP) .................................. 2007-132995

(51) Int. Cl.
C08G 75/00    (2006.01)
(52) U.S. Cl. ..... 528/373; 528/128; 528/125; 548/343.5; 548/170
(58) Field of Classification Search .................. 528/125, 528/128, 373
See application file for complete search history.

(56) References Cited

U.S. PATENT DOCUMENTS

| 7,163,988 B2 | 1/2007 | Rozhanskii et al. |
| 2007/0015024 A1 | 1/2007 | Kanaoka et al. |

FOREIGN PATENT DOCUMENTS

| JP | 2001-342241 | 12/2001 |
| JP | 2004-137444 | 5/2004 |
| JP | 2005-60625 | 3/2005 |
| JP | 2006 342244 | 12/2006 |
| JP | 2007 22959 | 2/2007 |
| JP | 2007 48747 | 2/2007 |
| JP | 2007022959 | * 2/2007 |
| JP | 2007 109472 | 4/2007 |

OTHER PUBLICATIONS

"Polymer Preprints", Japan, vol. 42, No. 7, The Society o f Polymer Science, 1993, pp. 2490-2492, (with English translation).
"Polymer Preprints", Japan, vol. 43, No. 3, The Society o f Polymer Science, 1994, pp. 735-736, (with English Abstract and translation).
"Polymer Preprints", Japan, vol. 42, No. 3, The Society o f Polymer Science, 1993, p. 730, (with English translation).

* cited by examiner

*Primary Examiner* — Shane Fang
(74) *Attorney, Agent, or Firm* — Oblon, Spivak, McClelland, Maier & Neustadt, L.L.P.

(57) ABSTRACT

Provided is a solid polymer electrolyte having increased heat resistance and high proton conductivity and a proton conductive membrane composed of the electrolyte. Also provided is a copolymer having a sulfonic acid group. The copolymer includes a repeating unit represented by Formula (1):

[Formula 1]

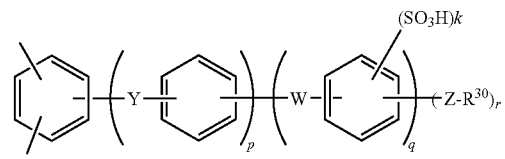

(1)

(in the formula, Y denotes at least one kind of structure selected from the group consisting of —CO—, —SO$_2$—, —SO—, —CONH—, —COO—, —(CF$_2$)$_l$— (l is an integer of 1 to 10), and —C(CF$_3$)$_2$—; W denotes at least one kind of structure selected from the group consisting of a direct bond, —CO—, —SO$_2$—, —SO—, —CONH—, —COO—, —(CF$_2$)$_l$— (l is an integer of 1 to 10), —C(CF$_3$)$_2$—, —O—, and —S—; Z denotes a direct bond or at least one kind of structure selected from the group consisting of —(CH$_2$)$_l$— (l is an integer of 1 to 10), —C(CH$_3$)$_2$—, —O—, —S—, —CO—, and —SO$_2$—; R$^{30}$ denotes a nitrogen-containing aromatic ring having a substituent represented by —SO$_3$H, —O(CH$_2$)$_h$SO$_3$H, or —O(CF$_2$)$_h$SO$_3$H (h is an integer of 1 to 12); p is an integer of 0 to 10; q is an integer of 0 to 10; r is an integer of 1 to 5; and k is an integer of 0 to 4).

5 Claims, No Drawings

AROMATIC COMPOUND AND POLYARYLENE COPOLYMER HAVING NITROGEN-CONTAINING HETEROCYCLE INCLUDING SULFONIC ACID GROUP IN SIDE CHAIN

TECHNICAL FIELD

The present invention relates to a novel aromatic compound, a polyarylene copolymer, and a proton-conducting membrane including the same and, more specifically, relates to a polyarylene copolymer including a structure having a sulfonated nitrogen-containing heterocycle in a side chain and being useful for a proton-conducting membrane, which can be used in, for example, a primary cell electrolyte, a secondary cell electrolyte, fuel cell polymer solid electrolyte, a display element, various types of sensors, a signal transmission medium, a solid condenser, or an ion-exchange membrane, and relates to a novel aromatic compound used in the copolymer.

BACKGROUND ART

A fuel cell has high power generation efficiency and is an environment-friendly power generation system because of being low in discharge. In accordance with the recent increase in attention on global environment protection and departure from dependence on fossil fuel, the fuel cell attracts lots of attention. The fuel cell is expected to be mounted on, for example, small-scale decentralized power generation facilities; a power generation system serving as a driving source of a movable object such as an automobile or a ship; or a mobile phone or a mobile personal computer, instead of a secondary cell such as a lithium-ion cell.

A polymer electrolyte fuel cell has a pair of electrodes on both sides of a proton-conductive solid polymer electrolyte membrane and obtains electomotive force by supplying pure hydrogen or modified hydrogen gas serving as fuel gas to one of the electrodes (fuel electrode) and supplying oxygen gas or air serving as an oxidant to the other electrode (air electrode). Furthermore, water electrolysis produces hydrogen and oxygen by an inverse reaction of the fuel cell reaction by electrolyzing water with the solid polymer electrolyte membrane.

However, in an actual fuel cell or water electrolysis, in addition to these main reactions, side reactions occur. A typical side reaction is generation of hydrogen peroxide ($H_2O_2$). Radical species derived from the hydrogen peroxide is a cause of deteriorating the solid polymer electrolyte film.

Conventionally, as the solid polymer electrolyte membrane, perfluorosulfonic acid membrane, which is commercially available under a trade name of Nafion (registered trademark, manufactured by DuPont), Asiplex (registered trademark, manufactured by Asahi Chemical Industries Co., Ltd.), or Flemion (registered trademark, manufactured by Asahi Glass Co., Ltd.), has been used because of its excellent chemical stability.

However, the perfluorosulfonic acid membrane, such as Nafion, is difficult to be produced and therefore has a problem that it is very expensive. This is a large obstacle preventing the membrane from being widely applied to consumer purposes, such as fuel cell automobiles and household fuel cell power generation systems. In addition, since many fluorine atoms are included in the molecule, it has a problem that disposal treatment after use is also a heavy burden on the environment.

In addition, in the fuel cell, the membrane resistance is reduced by being operated at higher temperature and being reduced in thickness of the proton-conducting membrane between the electrodes, and the output power generation can be thereby increased. However, the perfluorosulfonic acid membrane has a heat deformation temperature of about 80 to 100° C. and, thereby, is extremely poor in creep resistance at high temperature. Therefore, the temperature for power generation must be maintained at 80° C. or less when the membrane is used in a fuel cell. Thus, there is a problem of limitation in output power generation. In addition, the stability of membrane thickness in long-term use is poor. Therefore, in order to avoid short circuit (short) between electrodes, a certain thickness (50 µm or more) is necessary, and it is believed that it is difficult to thin down the thickness.

In order to solve these problems of the perfluorosulfonic acid membrane, many studies on solid polymer electrolyte membrane, not containing fluorine atoms, being more inexpensive, and having a thermally stable main chain skeleton, such as one that is also used in engineer plastics, have been currently conducted. Polymers in which a polyarylene-based, polyetheretherketone-based, polyethersulfone-based, polyphenylene sulfide-based, polyimide-based, or polybenzazole-based main chain aromatic ring is sulfonated have been proposed (Polymer Preprints, Japan, Vol. 42, No. 7, pp. 2490-2492 (1993): Non-patent document 1, Polymer Preprints, Japan, Vol. 43, No. 3, pp. 735-736 (1994): Non-patent document 2, Polymer Preprints, Japan, Vol. 42, No. 3, p. 730 (1993): Non-patent document 3).

However, these polymers whose main chain aromatic rings are sulfonated have high water absorbability and are poor in hot water resistance. Therefore, the degree of introduction of a hydrophilic group, such as a sulfonic acid group, is limited. Furthermore, the polymers are materials that are poor in resistance to a Fenton reagent (resistance to hydroxy radicals) serving as a scale of power generation durability. In addition, when an electrolyte membrane of such a polymer is exposed to a high temperature of 100° C. or more for a long period of time, the sulfonic acid is eliminated to cause a reduction in proton conductivity or to bring about a cross-linking reaction with another aromatic ring to which a sulfonic acid group is not introduced, resulting in a problem of embrittlement. If the embrittlement of the membrane progresses, rupture (pinhole) occurs in the membrane during long-term power generation, resulting in a high possibility of impossible power generation.

Non-patent document 1: Polymer Preprints, Japan, Vol. 42, No. 7, pp. 2490-2492 (1993)

Non-patent document 2: Polymer Preprints, Japan, Vol. 43, No. 3, pp. 735-736 (1994)

Non-Patent Document 3: Polymer Preprints, Japan, Vol. 42, No. 3, p. 730 (1993)

DISCLOSURE OF INVENTION

Problems to be Solved by the Invention

It is an object of the present invention to provide a solid polymer electrolyte excellent in proton conductivity by solving the problems of the conventionally investigated fluorine electrolyte membranes and aromatic electrolyte membranes and improving heat resistance thereof, and to provide a proton-conducting membrane composed of the electrolyte.

Means for Solving the Problems

The present inventors have conducted intensive studies for achieving the above-mentioned object and, as a result, have found the fact that a sulfonated polyarylene derived from a monomer having a nitrogen-containing heterocycle including a sulfonic acid group in a side chain is a polymer electrolyte that is excellent in heat resistance and has high proton conductivity and have arrived at a novel polymer material satisfying the object of the present invention.

That is, the present invention is as follows:

[1] An aromatic compound represented by the following Formula (1):

[Formula 1]

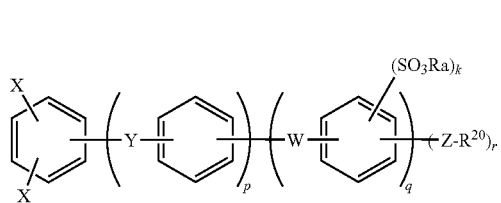

(in Formula (1), each X denotes an atom or a group selected from halogen atoms (chlorine, bromine, and iodine) excluding fluorine atoms and —OSO$_2$Rb (here, Rb denotes an alkyl group, a fluorine-substituted alkyl group, or an aryl group); Y denotes at least one kind of structure selected from the group consisting of —CO—, —SO$_2$—, —SO—, —CONH—, —COO—, —(CF$_2$)$_l$— (l is an integer of 1 to 10), and —C(CF$_3$)$_2$—; W denotes at least one kind of structure selected from the group consisting of a direct bond, —CO—, —SO$_2$—, —SO—, —CONH—, —COO—, —(CF$_2$)$_l$— (l is an integer of 1 to 10), —C(CF$_3$)$_2$—, —O—, and —S—; Z denotes a direct bond or at least one kind of structure selected from the group consisting of —(CH$_2$)$_l$— (l is an integer of 1 to 10), —C(CH$_3$)$_2$—, —O—, —S—, —CO—, and —SO$_2$—; Ra denotes a hydrocarbon group having 1 to 20 carbon atoms; R$^{20}$ denotes a nitrogen-containing heterocycle having at least one substituent represented by —SO$_3$Rc, —O(CH$_2$)$_h$SO$_3$Rc, or —O(CF$_2$)$_h$SO$_3$Rc (h is an integer of 1 to 12, and Rc denotes a hydrocarbon group having 1 to 20 carbon atoms); p is an integer of 0 to 10; q is an integer of 0 to 10; r is an integer of 1 to 5; and k is an integer of 0 to 4);

[2] The aromatic compound according to the above [1], wherein the nitrogen-containing heterocycle is at least one group derived from a compound selected from the group consisting of nitrogen-containing heterocycles consisting of pyrrole, thiazole, isothiazole, oxazole, isoxazole, imidazole, imidazoline, imidazolidine, pyrazole, 1,3,5-triazine, pyridine, pyrimidine, pyridazine, pyrazine, indole, quinoline, isoquinoline, burine, tetrazole, tetrazine, triazole, carbazole, acridine, quinoxaline, quinazoline, indolizine, isoindole, 3H-indole, 2H-pyrrole, 1H-indazole, purine, phthalazine, naphthyridine, cinnoline, pteridine, carboline, phenanthridine, perimidine, phenanthroline, phenazine, phenarsazine, phenothiazine, furazan, phenoxazine, pyrrolidine, pyrroline, pyrazoline, pyrazolidine, piperidine, piperazine, indoline, isoindoline, and quinuclidine, and derivatives thereof;

[3] The aromatic compound according to the above [1] or [2], wherein Y denotes —CO— or —SO$_2$—, W and Z each denote a direct bond, —CO—, —SO$_2$—, —O—, or —S—, p and q are each an integer of 0 to 2, and r is an integer of 1 or 2;

[4] A polyarylene copolymer having a sulfonic acid group, the copolymer including a repeating unit represented by the following Formula (2):

[Formula 2]

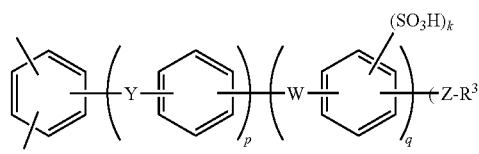

(in Formula (2), Y denotes at least one kind of structure selected from the group consisting of —CO—, —SO$_2$—, —SO—, —CONH—, —COO—, —(CF$_2$)$_l$— (l is an integer of 1 to 10), and —C(CF$_3$)$_2$—; W denotes at least one kind of structure selected from the group consisting of a direct bond, —CO—, —SO$_2$—, —SO—, —CONH—, —COO—, —(CF$_2$)$_l$— (l is an integer of 1 to 10), —C(CF$_3$)$_2$—, —O—, and —S—; Z denotes a direct bond or at least one kind of structure selected from the group consisting of —(CH$_2$)$_l$— (l is an integer of 1 to 10), —C(CH$_3$)$_2$—, —O—, —S—, —CO—, and —SO$_2$—; R$^{30}$ denotes a nitrogen-containing aromatic ring having at least one substituent represented by —SO$_3$H, —O(CH$_2$)$_h$SO$_3$H, or —O(CF$_2$)$_h$SO$_3$H (h is an integer of 1 to 12); p is an integer of 0 to 10; q is an integer of 0 to 10; r is an integer of 1 to 5; and k is an integer of 0 to 4, and in single lines at the ends of each structural unit, a single line not showing a substituent on one side thereof means coupling with the adjacent structural unit);

[5] The copolymer according to the above [4], the copolymer further having a structure represented by the following Formula (3):

[Formula 3]

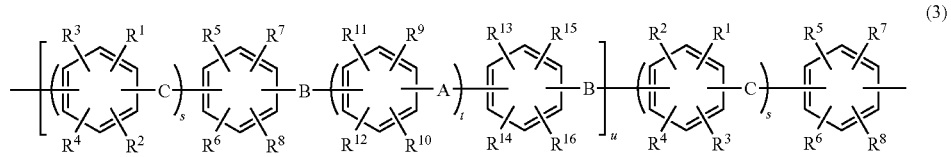

(in Formula (3), each A and C independently denotes a direct bond or at least one kind of structure selected from the group consisting of —CO—, —SO$_2$—, —SO—, —CONH—, —COO—, —(CF$_2$)$_l$— (l is an integer of 1 to 10), —C(CF$_3$)$_2$—, —(CH$_2$)$_l$— (l is an integer of 1 to 10), —C(CR'$_2$)$_2$— (R' is a hydrocarbon group or a cyclic hydrocarbon group), —O—, and —S—; each B independently denotes an oxygen atom or a sulfur atom; R$^1$ to R$^{16}$ may be the same or different from one another and each denote at least one kind of atom or group selected from the group consisting of hydrogen atoms, fluorine atoms, alkyl groups, halogenated alkyl groups that are partially or fully halogenated, allyl groups, aryl groups, nitro groups, and nitrile groups; s and t each denote an integer of 0 to 4; and u denotes 0 or an integer of 1 or more, and in single lines at the ends of each structural unit, a single line not showing a substituent on one side thereof means coupling with the adjacent structural unit);

[6] The copolymer according to the above [4] or [5], wherein Y denotes —CO— or —SO$_2$—, W and Z each denote a direct bond, —CO—, —SO$_2$—, —O—, or —S—, p and q each denote an integer of 0 to 2, and r denotes an integer of 1 or 2;

[7] The copolymer according to the above [4] or [5], wherein Y denotes —CO— or —SO$_2$—, W and Z each denote a direct bond, —CO—, —SO$_2$—, —O—, or —S—, p and q each denote an integer of 0 to 2, r denotes an integer of 1 or 2, R$^{30}$ denotes a derivative derived from a compound selected from the group consisting of pyridine, imidazole, and triazole each having a substituent represented by —SO$_3$H, —O(CH$_2$)$_h$SO$_3$H, or —O(CF$_2$)$_h$SO$_3$H (h is an integer of 1 to 12), and derivatives thereof;

[8] A polymer electrolyte composed of a copolymer according to any of the above [4] to [7]; and

[9] The polymer electrolyte according to the above [8], the polymer electrolyte having an ion-exchange capacity of 0.5 to 3 meq/g.

Advantages of the Invention

The novel aromatic compound of the present invention has an introduced nitrogen-containing heterocycle including a sulfonic acid group in a side chain. In addition, the copolymer of the present invention is derived from the novel aromatic compound and has the following effects when it is used as a conductive membrane due to the introduced nitrogen-containing heterocycle including a sulfonic acid group in a side chain.

The first is enhanced heat resistance, the second is high proton conductivity, and the third is excellent toughness and mechanical strength.

In addition, the copolymer also having a repeating unit represented by Formula (1), according to a preferred embodiment of the present invention, can easily control the amount of a sulfonic acid group to be introduced. The resulting sulfonic acid group-containing copolymer, when it serves as a conductive membrane, exhibits high proton conductivity over a wide temperature range and is excellent in strength without being brittle.

Therefore, the copolymer of the present invention can be used as a conductive membrane for, for example, a primary cell electrolyte, a secondary cell electrolyte, fuel cell polymer solid electrolyte, a display element, various types of sensors, a signal transmission medium, a solid condenser, or an ion-exchange membrane. This industrial significance is very large.

BEST MODES FOR CARRYING OUT THE INVENTION

The present invention will be described in detail below.

Novel Aromatic Compound

The aromatic compound of the present invention is represented by Formula (1):

[Formula 4]

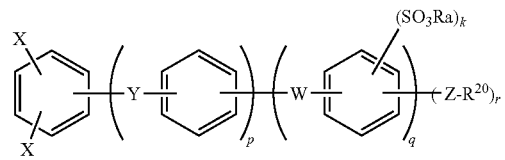

(1)

Each X denotes an atom or a group selected from halogen atoms (chlorine, bromine, and iodine) excluding fluorine atoms and —OSO$_2$Rb. Here, Rb denotes an alkyl group, a fluorine-substituted alkyl group, or an aryl group. Specific examples include a methyl group, an ethyl group, a trifluoromethyl group, and a phenyl group.

Y denotes at least one kind of structure selected from the group consisting of —CO—, —SO$_2$—, —SO—, —CONH—, —COO—, —(CF$_2$)$_l$— (l is an integer of 1 to 10), and —C(CF$_3$)$_2$— and is more preferably —CO— or —SO$_2$—.

W denotes at least one kind of structure selected from the group consisting of a direct bond, —CO—, —SO$_2$—, —SO—, —CONH—, —COO—, —(CF$_2$)$_l$— (l is an integer of 1 to 10), —C(CF$_3$)$_2$—, —O—, and —S—. W is more preferably a direct bond, —CO—, —SO$_2$—, —O—, or —S—.

Z denotes a direct bond or at least one kind of structure selected from the group consisting of —(CH$_2$)$_l$— (l is an integer of 1 to 10), —C(CH$_3$)$_2$—, —O—, —S—, —CO—, and —SO$_2$— and is more preferably a direct bond, —O—, —CO—, or —SO$_2$—.

Ra denotes a hydrocarbon group having 1 to 20 carbon atoms and is more preferably a hydrocarbon group having 4 to 20 carbon atoms. Specific examples include straight-chain hydrocarbon groups, branched hydrocarbon groups, alicyclic hydrocarbon groups, and hydrocarbon groups having 5-membered heterocycles, such as a methyl group, an ethyl group, an n-propyl group, an iso-propyl group, a tert-butyl group, an iso-butyl group, an n-butyl group, a sec-butyl group, a neopentyl group, a cyclopentyl group, a hexyl group, a cyclohexyl group, a cyclopentylmethyl group, a cyclohexylmethyl group, an adamantyl group, an adamantanemethyl group, a 2-ethylhexyl group, a bicyclo[2.2.1]heptyl group, a bicyclo[2.2.1]heptylmethyl group, a tetrahydrofurfuryl group, a 2-methylbutyl group, a 3,3-dimethyl-2,4-dioxolanemethyl group, a cyclohexylmethyl group, an adamantylmethyl group, and a bicyclo[2.2.1]heptylmethyl group. Among them, an n-butyl group, a neopentyl group, a tetrahydrofurfuryl group, a cyclopentyl group, a cyclohexyl group, a cyclohexylmethyl group, an adamantylmethyl group, and a bicyclo[2.2.1]heptylmethyl group are preferred, and a neopentyl group is further preferred.

R$^{20}$ denotes a nitrogen-containing heterocycle having at least one substituent represented by —SO$_3$Rc, —O(CH$_2$)$_h$SO$_3$Rc, or —O(CF$_2$)$_h$SO$_3$Rc (h is an integer of 1 to 12, and Rc denotes a hydrocarbon group having 1 to 20 carbon atoms). The nitrogen-containing heterocyclic compound refers to one of organic compounds having cyclic structures and is a cyclic compound containing nitrogen in addition to carbon atoms. The cyclic structure may contain two or more nitrogen atoms and further may contain oxygen or sulfur. Examples of the nitrogen-containing heterocyclic compound include pyrrole, thiazole, isothiazole, oxazole, isoxazole, imidazole, imidazoline, imidazolidine, pyrazole, 1,3,5-triazine, pyridine, pyrimidine, pyridazine, pyrazine, indole, quinoline, isoquinoline, burine, tetrazole, tetrazine, triazole, carbazole, acridine, quinoxaline, quinazoline, indolizine, isoindole, 3H-indole, 2H-pyrrole, 1H-indazole, purine, phthalazine, naphthyridine, cinnoline, pteridine, carboline, phenanthridine, perimidine, phenanthroline, phenazine, phenarsazine, phenothiazine, furazan, phenoxazine, pyrrolidine, pyrroline, pyrazoline, pyrazolidine, piperidine, piperazine, indoline, isoindoline, and quinuclidine. Imidazole, pyridine, and triazole are preferred.

Rc is more preferably a hydrocarbon group having 4 to 20 carbon atoms. Specific examples include straight-chain hydrocarbon groups, branched hydrocarbon groups, alicyclic hydrocarbon groups, and hydrocarbon groups having 5-membered heterocycles, such as a methyl group, an ethyl group, an n-propyl group, an iso-propyl group, a tert-butyl group, an iso-butyl group, an n-butyl group, a sec-butyl group, a neopentyl group, a cyclopentyl group, a hexyl group, a cyclohexyl group, a cyclopentylmethyl group, a cyclohexylmethyl group, an adamantyl group, an adamantanemethyl group, a 2-ethylhexyl group, a bicyclo[2.2.1]heptyl group, a bicyclo[2.2.1]heptylmethyl group, a tetrahydrofurfuryl group, a 2-methylbutyl group, a 3,3-dimethyl-2,4-dioxolanemethyl group, a cyclohexylmethyl group, an adamantylmethyl group, and a bicyclo[2.2.1]heptylmethyl group. Among them, an n-butyl group, a neopentyl group, a tetrahydrofurfuryl group, a cyclopentyl group, a cyclohexyl group, a cyclohexylmethyl group, an adamantylmethyl group, and a bicyclo[2.2.1]heptylmethyl group are preferred, and a neopentyl group is further preferred.

p denotes an integer of 0 to 10, more preferably an integer of 0 to 4, and is further preferably an integer of 0 to 2.

q denotes an integer of 0 to 10, more preferably an integer of 0 to 4, and is further preferably an integer of 0 to 2.

r denotes an integer of 1 to 5, more preferably an integer of 1 to 3, and is further preferably an integer of 1 or 2.

k denotes an integer of 0 to 4, more preferably an integer of 0 to 3, and is further preferably an integer of 0 to 2.

Examples of a preferred combination of Y, W, Z, p, q, r, and k are as follows:
(1) p=1, q=0, and r=1, and a structure of Y=—CO— and Z=—O—;
(2) p=1, q=0, and r=1, and a structure of Y=—CO— and Z=—S—;
(3) p=1, q=1, r=1, and k=1, and a structure of Y=—CO—, W=—CO—, and Z=—O—;
(4) p=1, q=1, r=1, and k=1, and a structure of Y=—CO—, W=—CO—, and Z=—S—;
(5) p=1, q=1, r=1, and k=1, and a structure of Y=—CO—, W=—CO—, and Z=—CO—;
(6) p=1, q=1, r=1, and k=1, and a structure of Y=—CO—, W=—SO$_2$—, and Z=—O—;
(7) p=1, q=1, r=1, and k=1, and a structure of Y=—CO—, W=—SO$_2$—, and Z=—CO—;
(8) p=0, q=1, r=1, and k=1, and a structure of W=—CO— and Z=—O—;
(9) p=0, q=1, r=1, and k=0, and a structure of W=—CO— and Z=—O—;
(10) p=0, q=1, r=1, and k=1, and a structure of W=—CO— and Z=—S—;
(11) p=0, q=1, r=1, and k=0, and a structure of W=—CO— and Z=—S—;
(12) p=0, q=0, and r=1, and a structure of Z=—CO—;
(13) p=1, q=0, and r=1, and a structure of Y=—CO— and Z=—CO—;
(14) p=0, q=1, r=1, and k=1, and a structure of W=—CO— and Z=—CO—; and
(15) p=0, q=0, and r=1, and a structure of Z is a direct bond.

Specific examples of the aromatic compound of the present invention include the following structures.

[Formula 5]

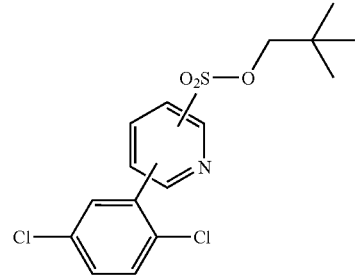

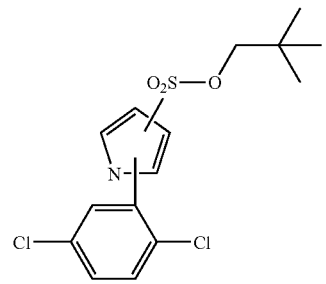

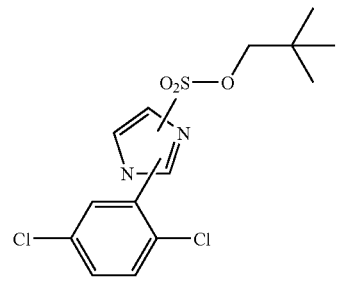

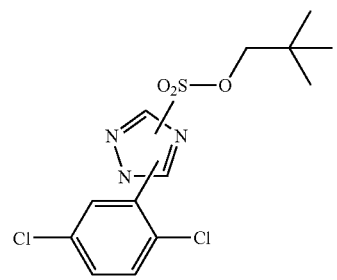

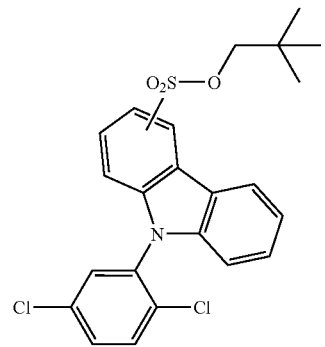

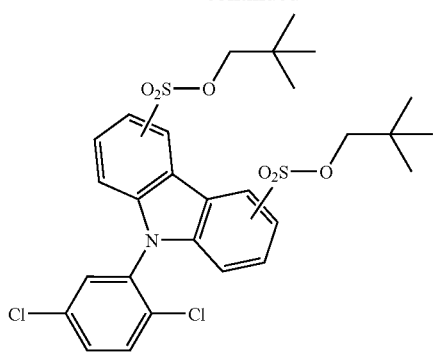
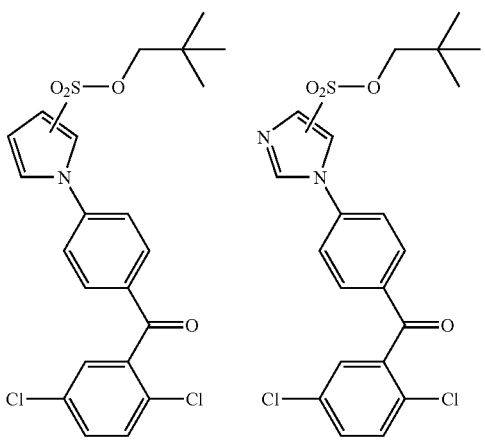
[Formula 6]
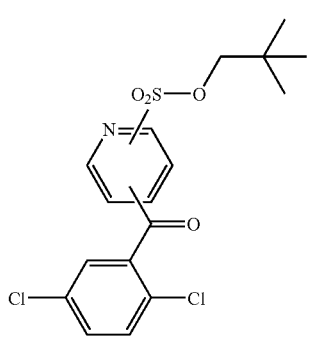
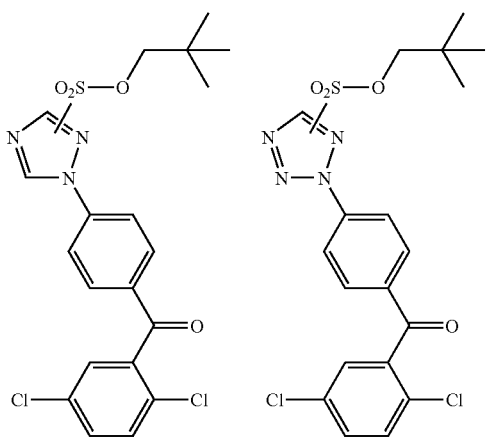
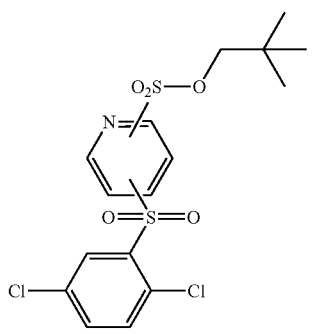
[Formula 7]
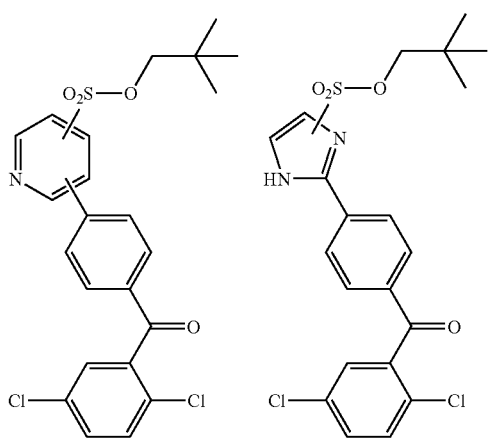
[Formula 8]
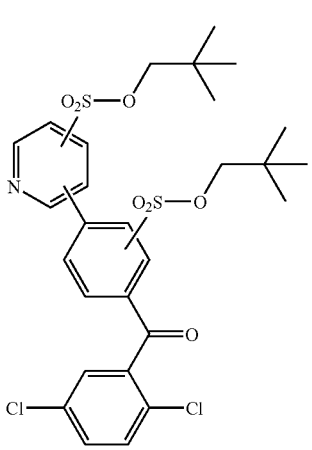

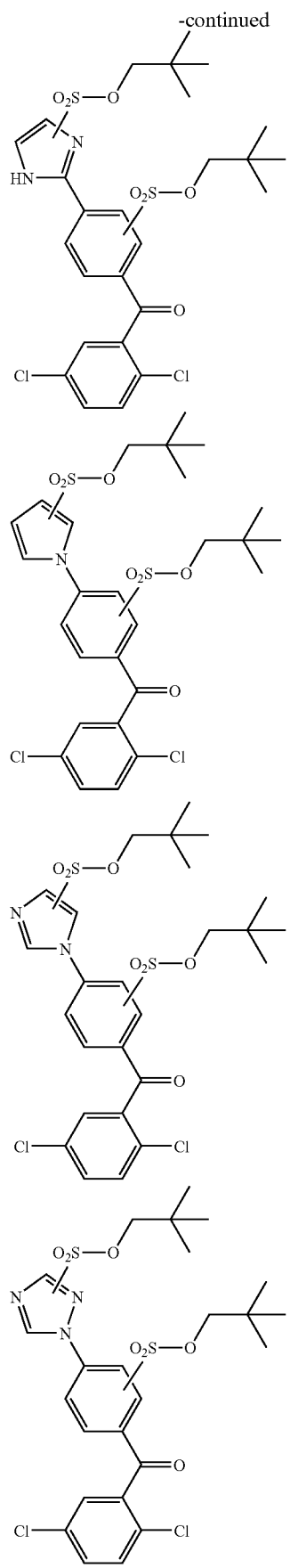
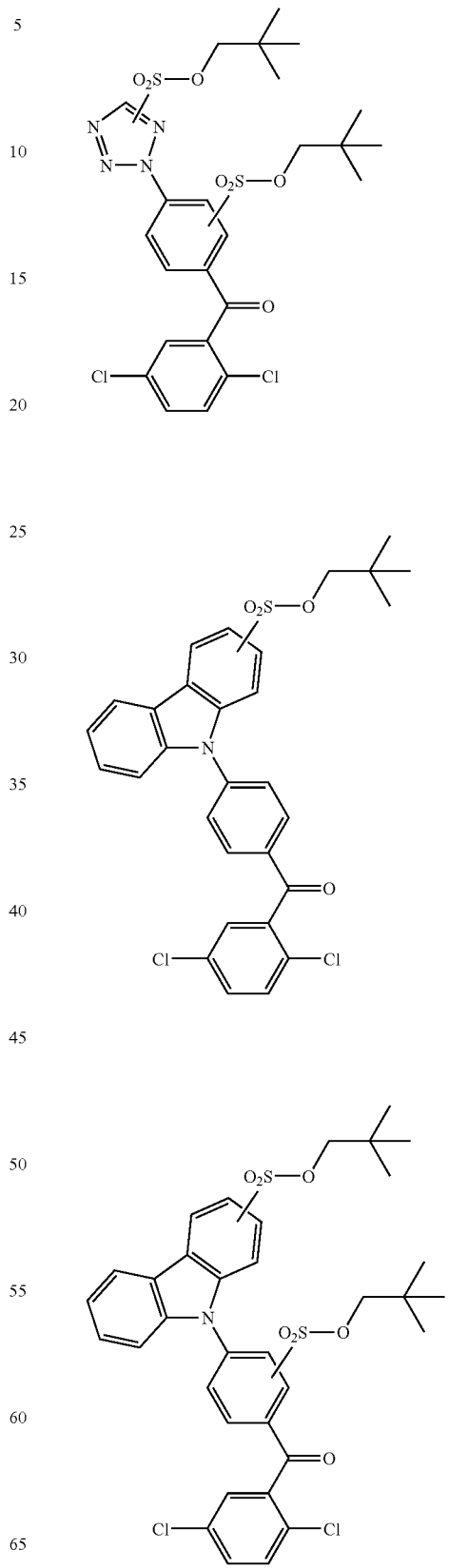
[Formula 9]

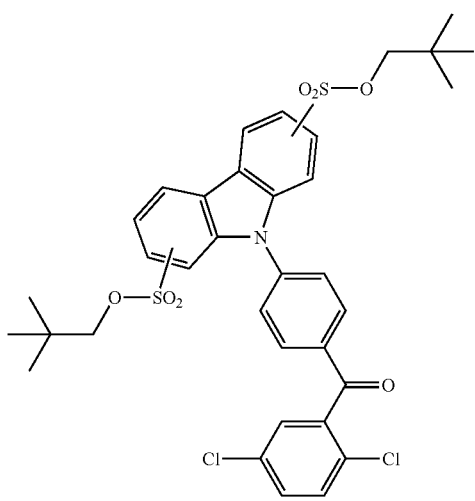
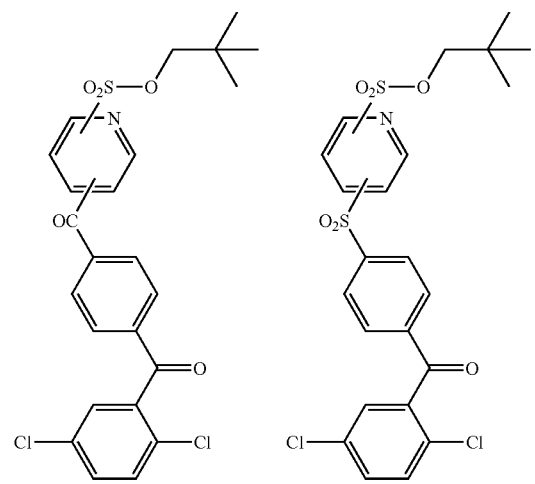
[Formula 11]
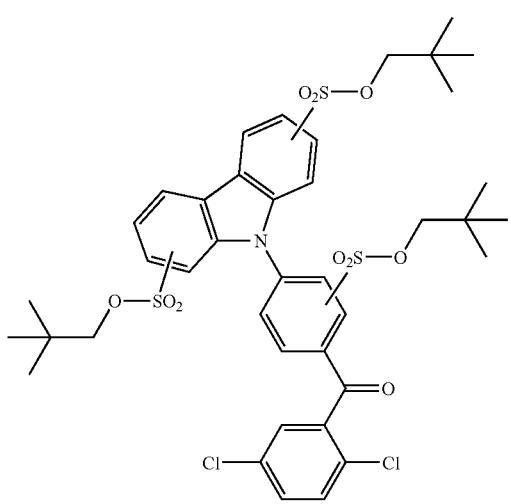
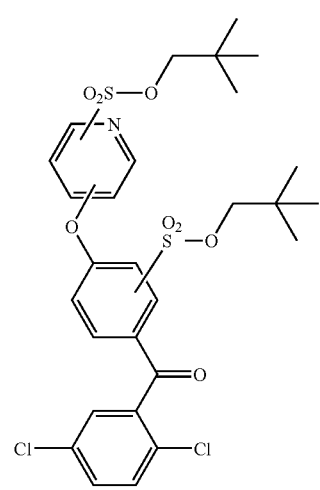
[Formula 10]
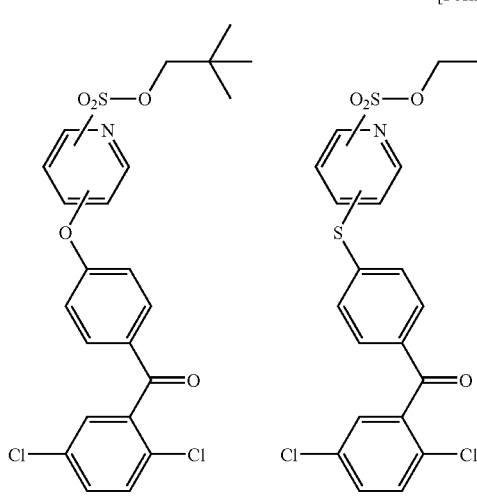
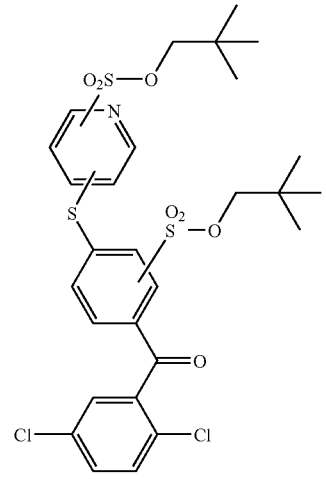

-continued
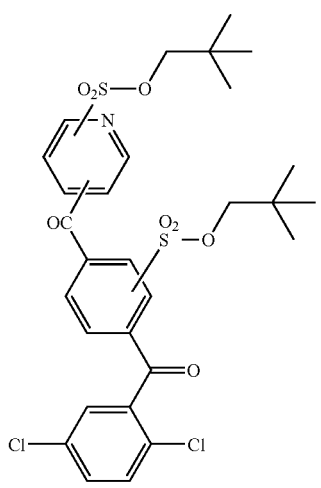
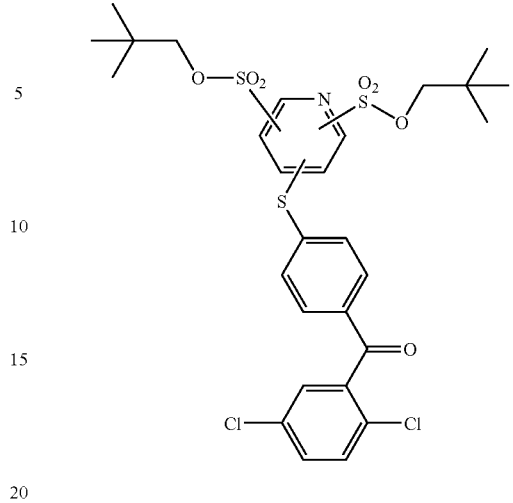
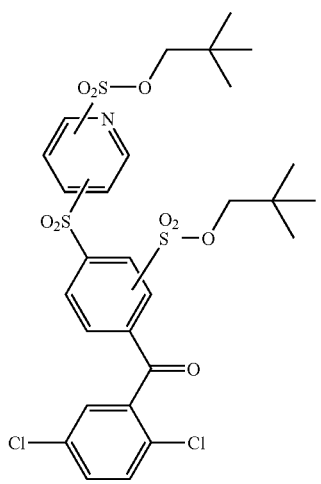
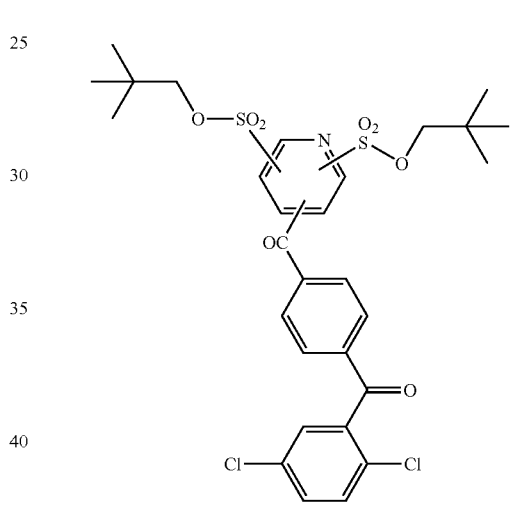
[Formula 12]
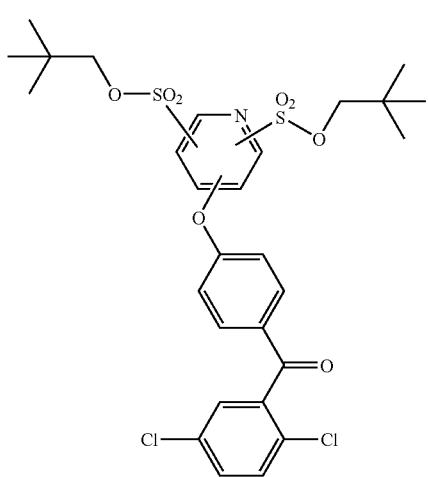
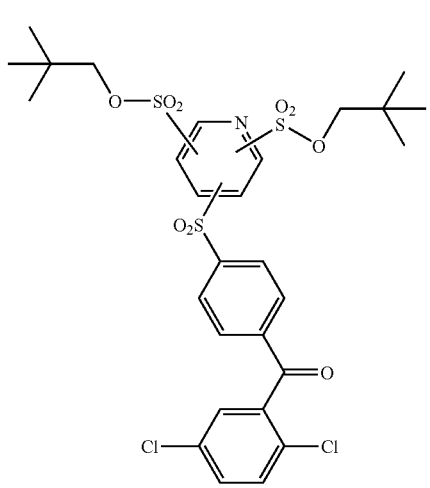

[Formula 13]
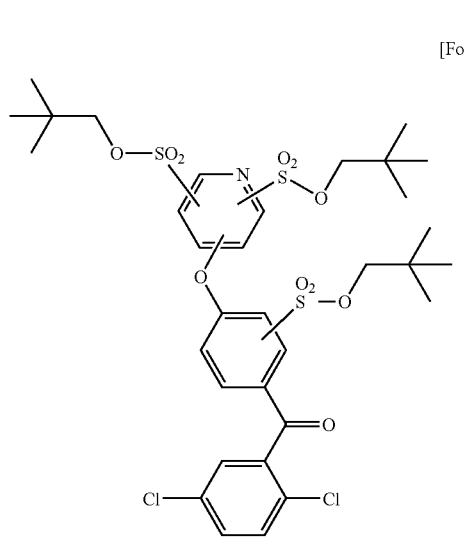
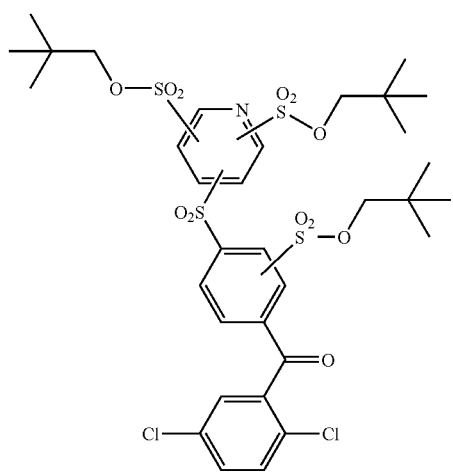
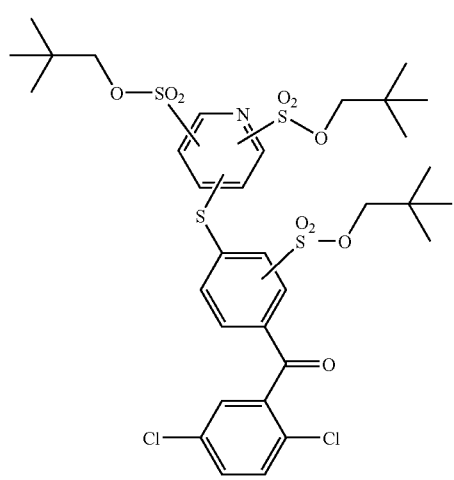
[Formula 14]
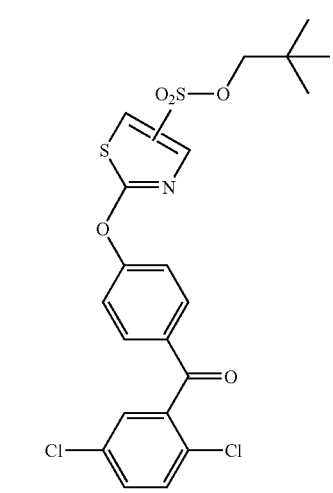
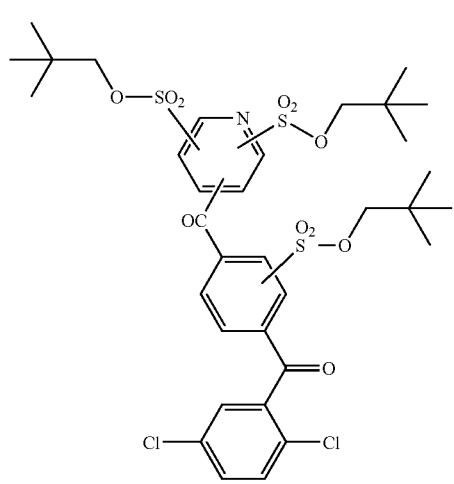
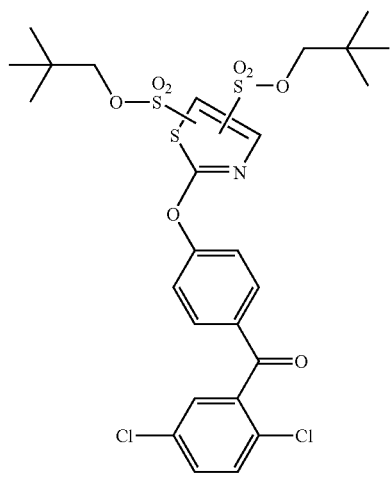

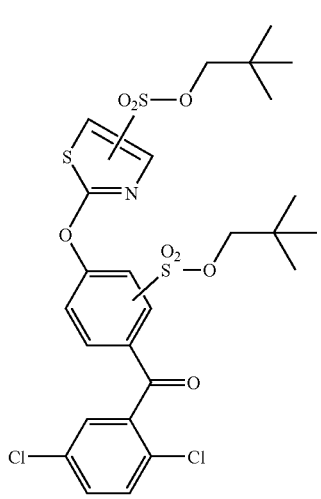
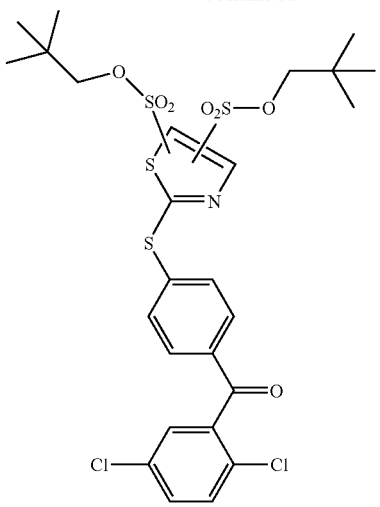
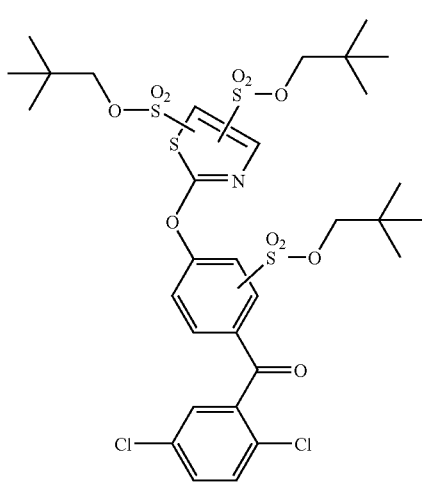
[Formula 15]
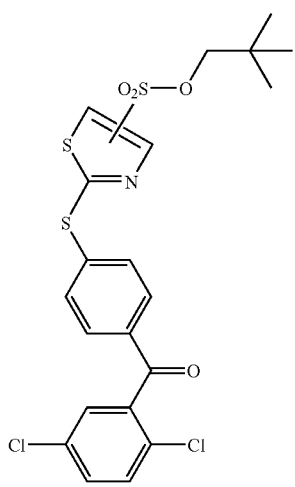
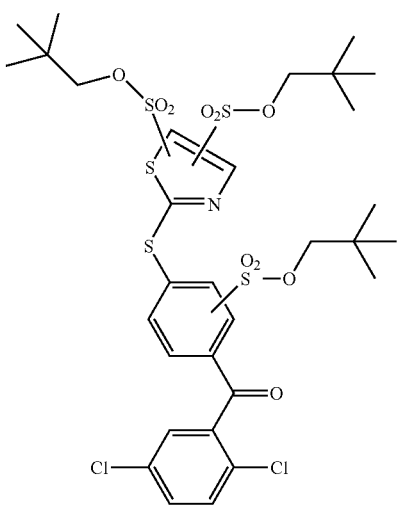

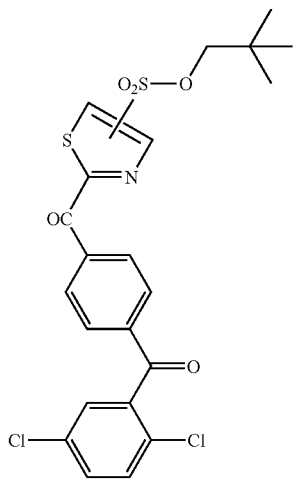
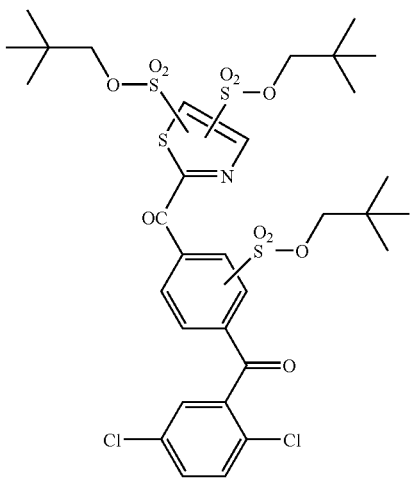
[Formula 16]
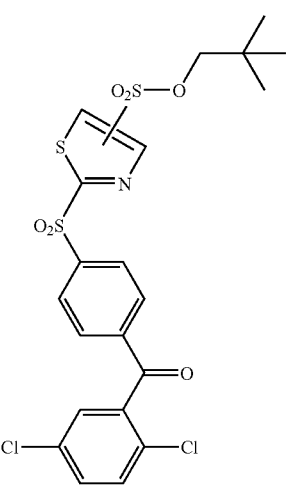
[Formula 17]
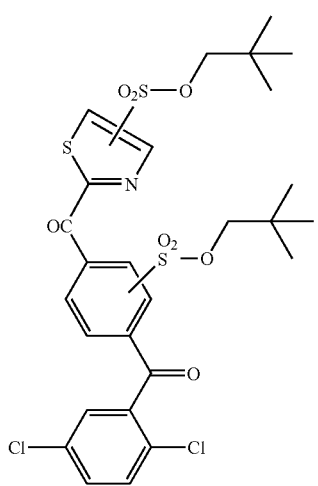
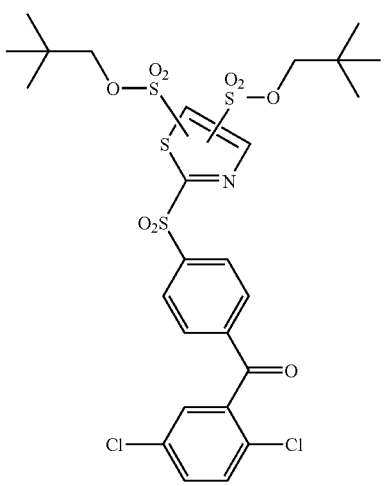

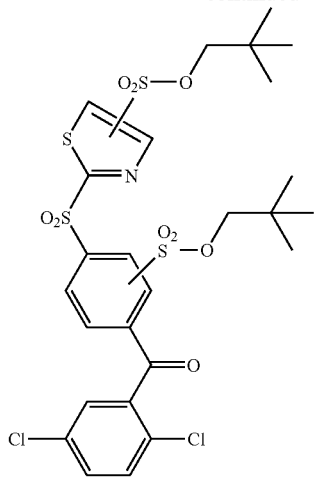
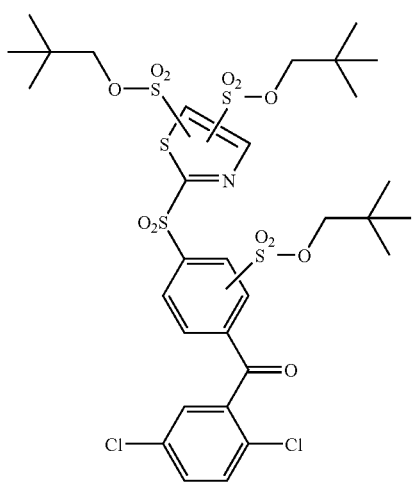
[Formula 18]
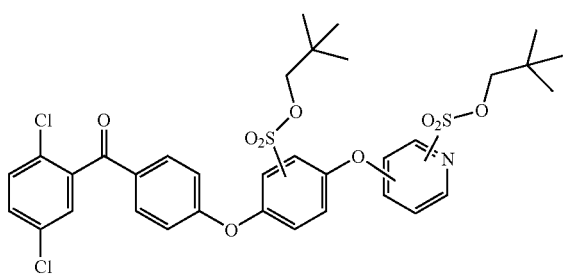
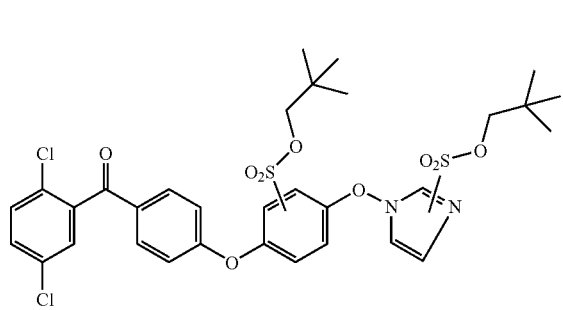
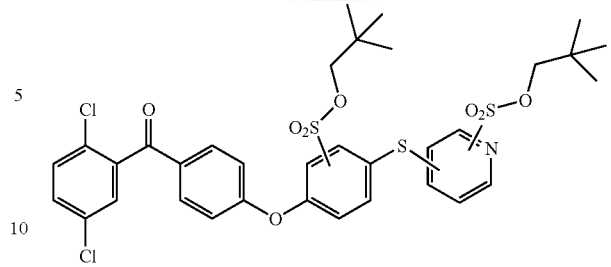
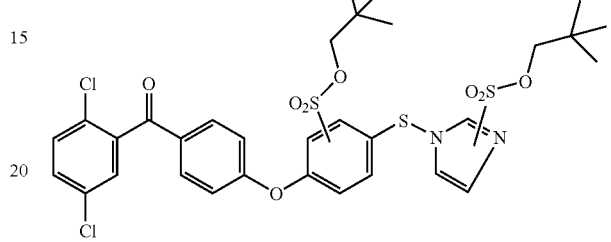
[Formula 19]
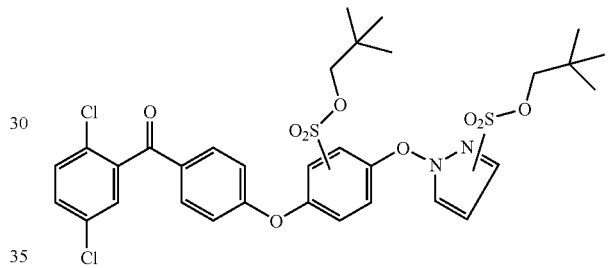
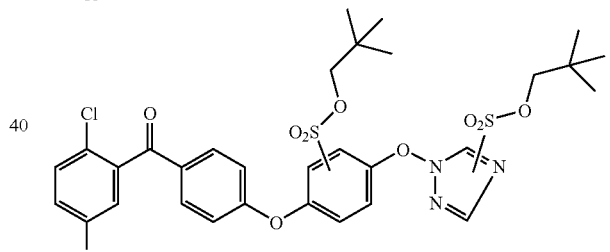
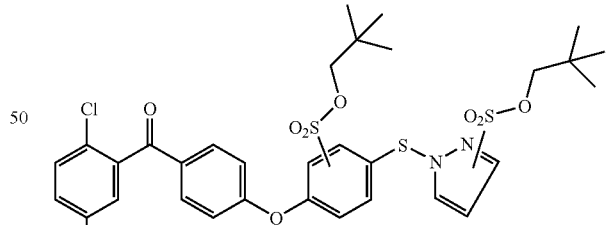
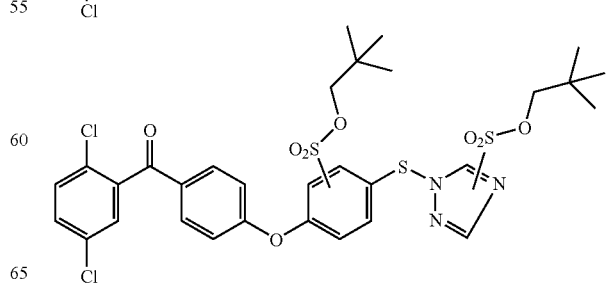

-continued

[Formula 20]

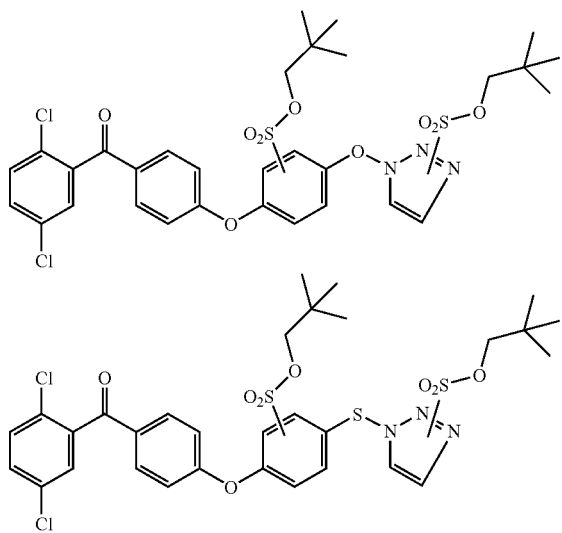

In addition, examples of the aromatic compound represented by Formula (1) according to the present invention further include compounds in which chlorine atoms of the above-mentioned compounds are substituted by bromine atoms and compounds in which —CO— of the above-mentioned compounds is substituted by —SO$_2$—. Furthermore, isomers having chlorine atoms or bromine atoms at different bonding positions are also included.

The Ra group in Formula (1) is preferably derived from primary alcohol and of which β carbon is preferably tertiary or quaternary carbon, from the standpoints of being excellent in stability during polymerization and not inhibiting polymerization and not causing cross-linking due to sulfonic acid generated by deesterification. Furthermore, it is preferred that these eater groups be derived from primary alcohol and of which β position be quaternary carbon.

The aromatic compound of the present invention may be a single compound or a mixture of a plurality of positional isomers.

The aromatic compound represented by Formula (1) can be synthesized by, for example, a reaction shown below. That is, compounds represented by Formulae (11) and (12) below and a nitrogen-containing heterocyclic compound are subjected to a nucleophilic substitution reaction and then to sulfonation using a sulfonating agent.

[Formula 21]

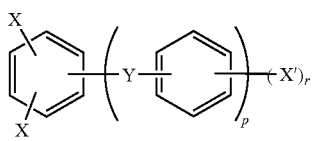

(11)

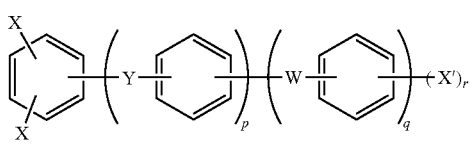

(12)

In the Formulae, the definitions of X, Y, W, p, q, and r are the same as those in Formula (1).

X' denotes a fluorine atom or a chlorine atom as a halogen atom and is more preferably a fluorine atom.

Specific examples of the compound represented by Formula (11) include:

2,4-dichloro-4'-fluorobenzophenone, 2,5-dichloro-4'-fluorobenzophenone, 2,6-dichloro-4'-fluorobenzophenone, 2,4-dichloro-2'-fluorobenzophenone, 2,5-dichloro-2'-fluorobenzophenone, 2,6-dichloro-2'-fluorobenzophenone, 2,4-dichlorophenyl-4'-fluorophenylsulfone, 2,5-dichlorophenyl-4'-fluorophenylsulfone, 2,6-dichlorophenyl-4'-fluorophenylsulfone, 2,4-dichlorophenyl-2'-fluorophenylsulfone. Among these compounds, 2,5-dichlorophenyl-4'-fluorophenylsulfone and 2,5-dichloro-4'-fluorobenzophenone are preferred.

Examples of the compound represented by Formula (12) include the following structures.

[Formula 22]

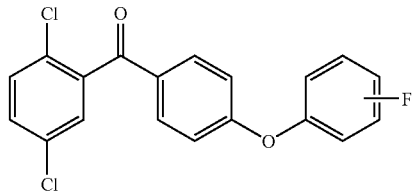

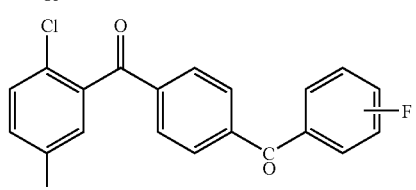

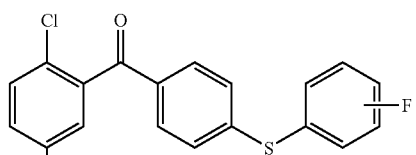

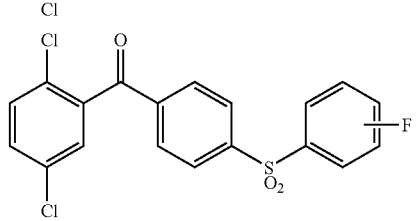

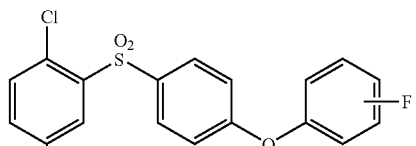

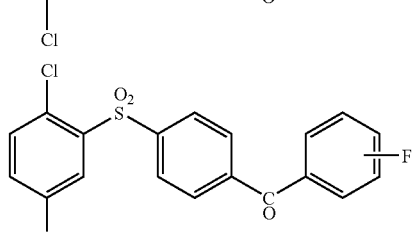

-continued

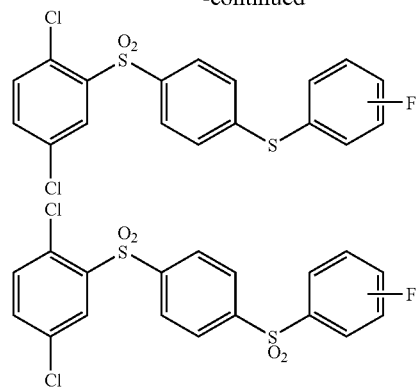

[Formula 23]

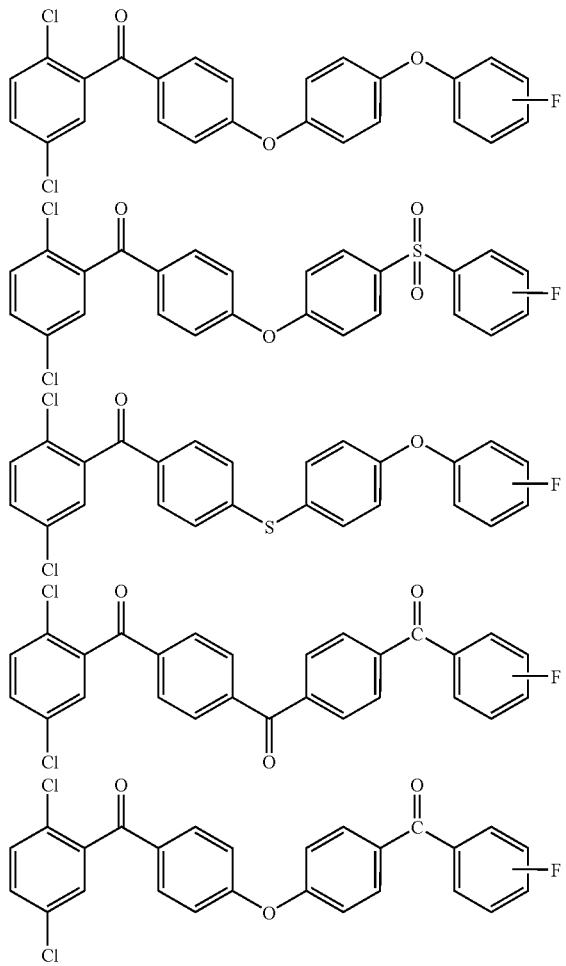

In addition, examples of the aromatic compound represented by Formula (12) according to the present invention further include compounds in which chlorine atoms of the above-mentioned compounds are substituted by bromine atoms and compounds in which —CO— of the above-mentioned compounds is substituted by —SO$_2$—. Furthermore, isomers having chlorine atoms or bromine atoms at different bonding positions are also included.

The nitrogen-containing heterocyclic compound refers to one of organic compounds having cyclic structures and is a cyclic compound containing nitrogen in addition to carbon atoms. The cyclic structure may contain two or more nitrogen atoms and further may contain oxygen or sulfur.

The nitrogen-containing heterocyclic compound has active hydrogen, and the active hydrogen and the group represented by X' of the compound represented by Formula (11) or (12) are subjected to a nucleophilic reaction.

Examples of the nitrogen-containing heterocyclic compound having active hydrogen include the following compounds:

imidazole, imidazoline, pyrazole, pyrrole, pyrrolidine, pyrroline, pyrazolidine, pyrazoline, piperidine, piperazine, indole, isoindole, indazole, indoline, isoindoline, morpholine, triazole, tetrazole, purine, carbazole, phenothiazine, phenoxazine, 2-hydroxypyridine, 3-hydroxypyridine, 4-hydroxypyridine, 2-hydroxypyridine, 2-mercaptopyridine, 3-mercaptopyridine, 4-mercaptopyridine, 3-hydroxyquinoline, 8-hydroxyquinoline, 2-mercaptopyrimidine, and 2-mercaptobenzthiazole.

For example, in a compound having a hydroxyl group or a mercapto group, hydrogen bonded to an oxygen atom or a sulfur atom becomes active hydrogen, and a nitrogen-containing heterocycle is introduced via the —O— or the —S— bond.

Furthermore, a hydrogen atom bonded to a nitrogen atom in a nitrogen-containing heterocycle and a hydrogen atom bonded to an atom other than the nitrogen in the heterocycle also become active hydrogen. In this case, the nitrogen-containing heterocycle is introduced through the generation of a direct bond with the nitrogen-containing heterocycle.

Among these compounds, 2-hydroxypyridine, 3-hydroxypyridine, 4-hydroxypyridine, imidazole, and triazole are preferred.

The reaction between a compound represented by Formula (11) or (12) and a nitrogen-containing heterocyclic compound having active hydrogen is preferably carried out in an organic solvent. The solvent is a polar solvent such as N-methyl-2-pyrrolidone, N,N-dimethylacetamide, sulfolane, diphenyl sulfone, or dimethyl sulfoxide. In order to accelerate the reaction, for example, an alkali metal, an alkali metal hydride, an alkali metal hydroxide, or an alkali metal carbonate is used. The reaction of the compound represented by Formula (11) or (12) and the nitrogen-containing heterocyclic compound having active hydrogen is carried out at an equimolar ratio or in an excessive amount of the nitrogen-containing heterocyclic compound having active hydrogen. Specifically, the molar amount of the nitrogen-containing heterocyclic compound having active hydrogen is preferably 1 to 3 times, particularly preferably 1 to 1.5 times that of the compound represented by Formula (11) or (12).

The reaction temperature is 0 to 300° C., preferably 10 to 200° C. The reaction time is 15 minutes to 100 hours, preferably 1 to 24 hours.

The resulting production is preferably purified by a method such as recrystallization before the use.

A compound in which p=0, q=0, and Z is other than a direct bond can be also synthesized by a reaction of compounds represented by Formulae (13) and (14) below and subsequent sulfonation or chlorosulfonation using a sulfonating agent.

[Formula 24]

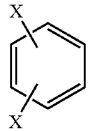

(13)

-continued

[Formula 25]

$$Z'\text{-}R^{20} \quad (14)$$

In the formula, the definitions of each X and $R^{20}$ are the same as those in Formula (1). In the case above, pyridine, imidazole, and triazole are particularly preferred.

Z' denotes at least one kind of structure selected from —COCl, —SO$_2$Cl, —COOH, —SO$_3$H, —COORd, —SO$_3$Rd, and —CHO. Rd denotes a hydrocarbon group having 1 to 20 carbon atoms, and specific examples thereof include a methyl group, an ethyl group, an n-propyl group, an iso-propyl group, a tert-butyl group, an iso-butyl group, an n-butyl group, and a sec-butyl group. A methyl group and an ethyl group are preferred.

When Z' is —COCl or —SO$_2$Cl, the reaction catalyst is preferably aluminum chloride, iron chloride, trifluoro boron, Nafion, or the like. In addition, the reaction may be carried out in the absence of solvents or may use a reaction solvent that does not react with the reaction product or the catalyst. Preferred examples of the solvent include chlorinated solvents such as dichloromethane, chloroform, 1,2-dichloroethane, chlorobenzene, and dichlorobenzene; and nitrobenzene, diphenylsulfone, methanesulfonic acid, trifluoromethanesulfonic acid, polyphosphoric acid, diethylether, and acetonitrile. The reaction temperature is from −20° C. to 300° C., preferably from 10° C. to 200° C. The reaction time is from 15 minutes to 100 hours, preferably from 1 hour to 24 hours. The reaction may be carried out under high pressure conditions, if necessary. The pressure is 1 to 10 atms, preferably 1 to 5 atms. The product is preferably purified by a method such as recrystallization before the use.

When p=0, q=0, and Z is a direct bond, compounds represented by Formulae (15) and (16) below are allowed to react.

[Formula 26]

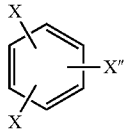

(15)

[Formula 27]

$$Z''\text{-}R^{20} \quad (16)$$

In the formula, the definitions of X and $R^{20}$ are the same as those in Formula (1). In the case above, pyridine, imidazole, and triazole are particularly preferred.

Z" denotes at least one kind of structure selected from —H, —F, —Cl, —Br, —I, —B(OH)$_2$, —MgBr, —Li-n-butyl, and —Li-tert-butyl.

When Z" is —H, X" denotes at least one kind of structure selected from fluorine atoms, chlorine atoms, bromine atoms, and iodine atoms that are activated by at least one selected from potassium carbonate, lithium carbonate, n-butyllithium, and tert-butyllithium. When Z" is —F, —Cl, —Br, or —I, X" denotes at least one kind of structure selected from —B(OH)$_2$, —MgBr, —Li-n-butyl, and —Li-tert-butyl. When Z" is —B(OH)$_2$, —MgBr, —Li-n-butyl, or —Li-tert-butyl, X" denotes at least one kind of structure selected from —F, —Cl, —Br, and —I.

Any reaction solvent that does not react with the product and the catalyst can be used, and preferred examples thereof include chlorinated solvents such as dichloromethane, chloroform, 1,2-dichloroethane, chlorobenzene, and dichlorobenzene; and diethylether, and tetrahydrofuran. The reaction temperature is from −30° C. to 300° C., preferably from −20° C. to 100° C. The reaction time is from 15 minutes to 100 hours, preferably from 1 hour to 24 hours. The reaction may be carried out under high pressure conditions, if necessary. The pressure is 1 to 10 atms, preferably 1 to 5 atms. The product is preferably purified by a method such as recrystallization, before the use.

Then, the aromatic compound obtained in the above-mentioned reaction is sulfonated. Examples of the sulfonating agent include sulfuric acid, chlorosulfonic acid, fuming sulfuric acid, and anhydrous sulfuric acid. The reaction is performed such that a sulfonic acid group is introduced into the target aromatic ring by controlling the reactivity of the sulfonating agent, reaction temperature, and reaction time. Preferred sulfonating agent is chlorosulfonic acid and fuming sulfuric acid. The reaction temperature when chlorosulfonic acid is used is preferably 80 to 130° C.

Then, the resulting sulfonic acid is converted into acid chloride. In this reaction, for example, thionyl chloride, phosphoryl chloride, or phosphorus pentachloride can be used. When chlorosulfonic acid is used as the sulfonating agent, since the sulfonic acid is isolated in the form of acid chloride, this step can be omitted.

Lastly, the aromatic compound of the present invention is obtained by esterification with various types of alcohol. Examples of the alcohol include straight-chain hydrocarbon groups, branched hydrocarbon groups, and alicyclic hydrocarbon groups, such as t-butyl alcohol, sec-butyl alcohol, isobutyl alcohol, n-butyl alcohol, n-pentyl alcohol, neopentyl alcohol, cyclopentyl alcohol, n-hexyl alcohol, cyclohexyl alcohol, heptyl alcohol, octyl alcohol, 2-ethylhexyl alcohol, cyclopentylmethyl alcohol, adamantyl alcohol, cyclohexylmethyl alcohol, adamantylmethyl alcohol, tetrahydrofurfuryl alcohol, 2-methylbutyl alcohol, 3,3-dimethyl-2,4-dioxolanemethyl alcohol, bicyclo[2.2.1]heptyl alcohol, and bicyclo[2.2.1]heptylmethyl alcohol. Among them, preferred as neopentyl alcohol, tetrahydrofurfuryl alcohol, cyclopentylmethyl alcohol, cyclohexylmethyl alcohol, adamantylmethyl alcohol, and bicyclo[2.2.1]heptylmethyl alcohol, and neopentyl alcohol is more preferred.

The esterification is preferably carried out in the presence of a base such as pyridine, triethylamine, tripropylamine, or trioctylamine.

Polyarylene Copolymer

The copolymer of the present invention has a main chain of phenylene bonds formed by polymerizing a monomer having a nitrogen-containing heterocycle including a sulfonic acid group in a side chain.

The copolymer having a nitrogen-containing heterocycle including a sulfonic acid group in a side chain, used in the present invention, includes a repeating unit (sulfonic acid unit) represented by Formula (I) below having a sulfonic acid group. More preferably, the copolymer includes a repeating unit represented by Formula (I) and a repeating unit (hydrophobic unit) represented by Formula (II) below not having a sulfonic acid group and is represented by Formula (III) below. In single lines at the ends of each structural unit, a single line not showing a substituent on one side thereof means coupling with the adjacent structural unit.

<Sulfonic Acid Unit>

[Formula 28]

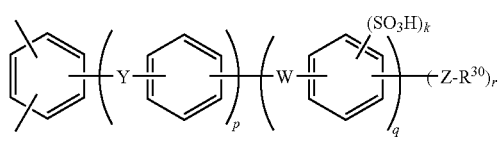

In Formula (1), the definitions of Y, Z, W, p, q, r, k, and $R^{30}$ in the formula are the same as those in Formula (2).

<Hydrophobic Unit>

[Formula 29]

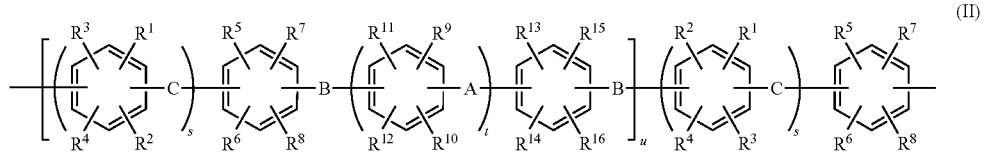

In Formula (II), each A and C independently denotes a direct bond or at least one kind of structure selected from the group consisting of —CO—, —SO$_2$—, —SO—, —CONH—, —COO—, —(CF$_2$)$_l$— (l is an integer of 1 to 10), —C(CF$_3$)$_2$—, —(CH$_2$)$_l$— (l is an integer of 1 to 10), —C(CR'$_2$)$_2$— (R' is a hydrocarbon group or a cyclic hydrocarbon group), —O—, and —S—. Here, specific examples of the structure represented by —C(CR'$_2$)$_2$— in which R' is a cyclic hydrocarbon group include cyclohexylidene groups and fluorenylidene groups.

Among them, preferred are a direct bond, —CO—, —SO$_2$—, —C(CF$_3$)$_2$—, —C(CR'$_2$)$_2$— (R' is a hydrocarbon group or a cyclic hydrocarbon group), and —O—.

Each B independently denotes an oxygen atom or a sulfur atom, preferably an oxygen atom.

$R^1$ to $R^{16}$ may be the same or different from one another and each denote at least one kind of atom or group selected from the group consisting of hydrogen atoms, fluorine atoms, alkyl groups, halogenated alkyl groups that are partially or fully halogenated, allyl groups, aryl groups, nitro groups, and nitrile groups.

Examples of the alkyl groups include a methyl group, an ethyl group, a propyl group, a butyl group, an amyl group, a hexyl group, a cyclohexyl group, and an octyl group. Examples of the halogenated alkyl groups include a trifluoromethyl group, a pentafluoroethyl group, a perfluoropropyl group, a perfluorobutyl group, a perfluoropentyl group, and a perfluorohexyl group. Examples of the allyl groups include a propenyl group, and examples of the aryl groups include a phenyl group and a pentafluorophenyl group.

s and t each denote an integer of 0 to 4. u denotes 0 or an integer of 1 or more, and the upper limit thereof is usually 100, preferably 1 to 80.

Examples of a preferred combination of the values of s and t and the structure of A, B, C, and $R^1$ to $R^{16}$ are as follows:

(1) s=1 and t=1, and a structure in which A is —C(CF$_3$)$_2$— or —C(CR'$_2$)$_2$— (R' is a hydrocarbon group or a cyclic hydrocarbon group), B is an oxygen atom, C is —CO— or —SO$_2$—, and $R^1$ to $R^{16}$ are each a hydrogen atom or a fluorine atom;

(2) s=1 and t=0, and a structure in which B is an oxygen atom, C is —CO— or —SO$_2$—, and $R^1$ to $R^{16}$ are each a hydrogen atom or a fluorine atom;

(3) s=0 and t=1, and a structure in which A is —C(CF$_3$)$_2$— or —C(CR'$_2$)$_2$— (R' is a hydrocarbon group or a cyclic hydrocarbon group), B is an oxygen atom, and $R^1$ to $R^{16}$ are each a hydrogen atom, a fluorine atom, or a nitrile group;

(4) s=1 and t=1 or 2, and a structure in which A is —C(CF$_3$)$_2$— or —C(CR'$_2$)$_2$— (R' is a hydrocarbon group or a cyclic hydrocarbon group), B is an oxygen atom, and $R^1$ to $R^{16}$ are each a hydrogen atom or a fluorine atom; and (5) s=0 and t=1 or 2, and a structure in which A is —C(CF$_3$)$_2$— or —C(CR'$_2$)$_2$— (R' is a hydrocarbon group or a cyclic hydrocarbon group), B is an oxygen atom, and $R^1$ to $R^{16}$ are each a hydrogen atom, a fluorine atom or a nitrile group.

<Polymer Structure>

[Formula 30]

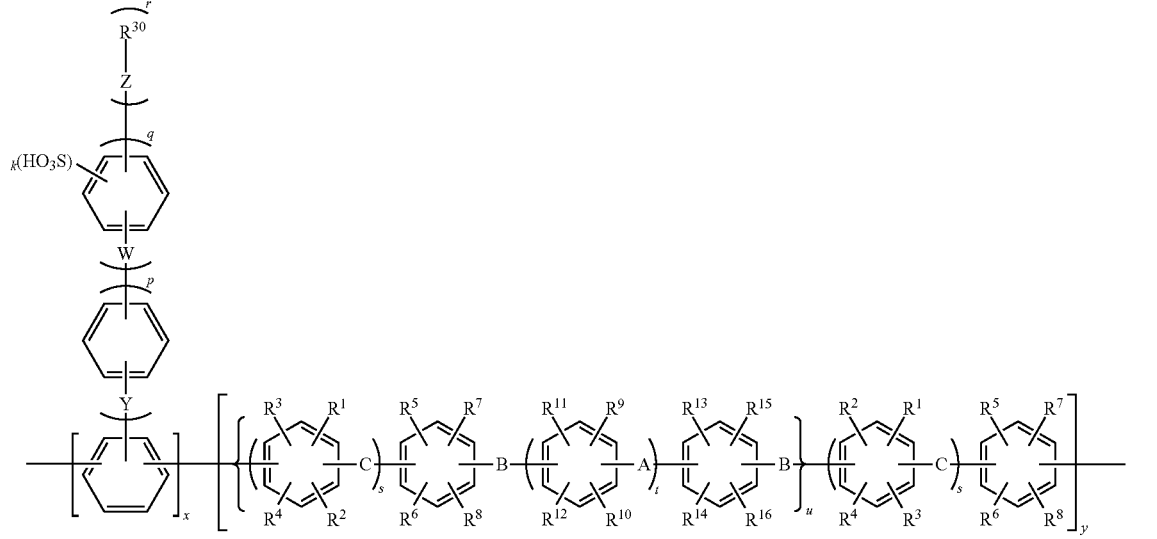

In Formula (III), the definitions of A, B, C, W, Y, Z, k, p, q, r, s, t, u, $R^{30}$, and $R^1$ to $R^{16}$ are equivalent to A, B, C, W, Y, Z, k, p, q, r, s, t, u, $R^{30}$, and $R^1$ to $R^{16}$ in Formulae (1) and (II), respectively; and x and y show mole fractions when x+y=100 mol %. In single lines at the ends of each structural unit, a single line not showing a substituent on one side thereof means coupling with the adjacent structural unit.

The copolymer having a sulfonic acid group used in the present invention includes the repeating structural unit represented by Formula (2), i.e., the unit x, at a ratio of 0.5 to 100 mol %, preferably 10 to 99.999 mol % and the repeating structural unit represented by Formula (3), i.e., the unit y, at a ratio of 99.5 to 0 mol %, preferably 90 to 0.001 mol %.

<Method of Producing Polymer>

The copolymer having a sulfonic acid group can be produced by any of the following two methods, method A or method B.

(Method A) A monomer having a sulfonic acid ester group that can be a structural unit represented by Formula (I) and a monomer or oligomer that can be a structural unit represented by Formula (II) are copolymerized, for example, by the method described in Japanese Patent Laid-open Publication No. 2004-137444 to produce polyarylene having the sulfonic acid ester group, and the sulfonic acid ester group is deesterified to convert the sulfonic acid ester group into a sulfonic acid group to synthesize a copolymer having the sulfonic acid group.

(Method B) A monomer having a skeleton represented by Formula (I) and not having a sulfonic acid group and a sulfonic acid ester group is copolymerized with a monomer or oligomer that can be a structural unit represented by Formula (II), for example, by the method described in Japanese Patent Laid-open Publication No. 2001-342241, and the resulting copolymer is sulfonated using a sulfonating agent to synthesize a copolymer having the sulfonic acid group. The sulfonated polyarylene of the present invention is preferably produced by method A. The monomer not having sulfonic acid that can be the structural unit represented by Formula (I), used in Method B, is represented by Formula (4) below.

[Formula 31]

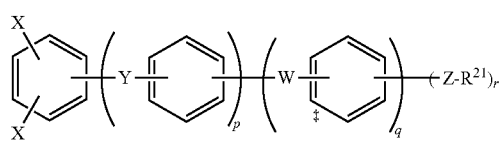

(4)

In Formula (4), the definitions of X, Y, Z, W, p, q, and r are the same as those in Formula (1).

$R^{21}$ denotes a nitrogen-containing heterocycle, and specific examples thereof include compounds selected from the group consisting of nitrogen-containing heterocycles consisting of pyrrole, thiazole, isothiazole, oxazole, isoxazole, imidazole, imidazoline, imidazolidine, pyrazole, 1,3,5-triazine, pyridine, pyrimidine, pyridazine, pyrazine, indole, quinoline, isoquinoline, burine, tetrazole, tetrazine, triazole, carbazole, acridine, quinoxaline, quinazoline, indolizine, isoindole, 3H-indole, 2H-pyrrole, 1H-indazole, purine, phthalazine, naphthyridine, cinnoline, pteridine, carboline, phenanthridine, perimidine, phenanthroline, phenazine, phenarsazine, phenothiazine, furazan, phenoxazine, pyrrolidine, pyrroline, pyrazoline, pyrazolidine, piperidine, piperazine, indoline, isoindoline, and quinuclidine, and derivatives thereof. Imidazole, pyridine, and triazole are preferred.

Specific examples of Formula (4) include the following structures.

[Formula 32]

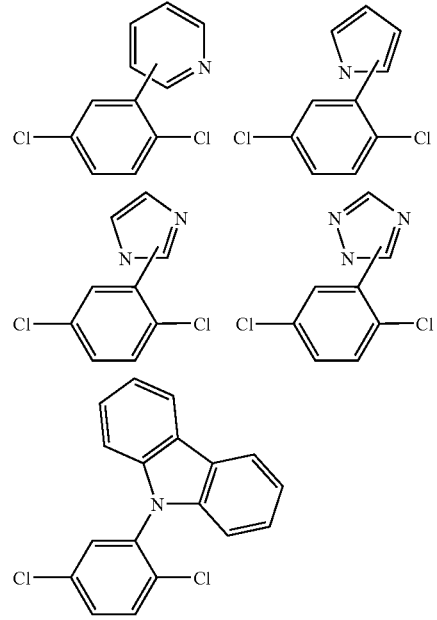

[Formula 33]

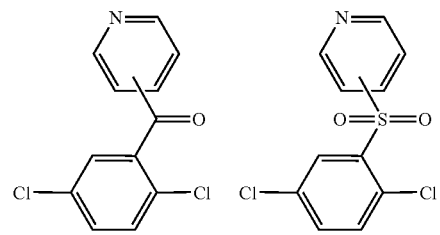

[Formula 34]

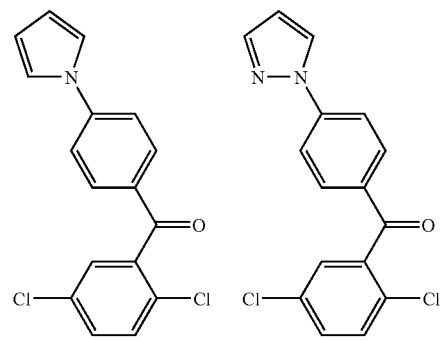

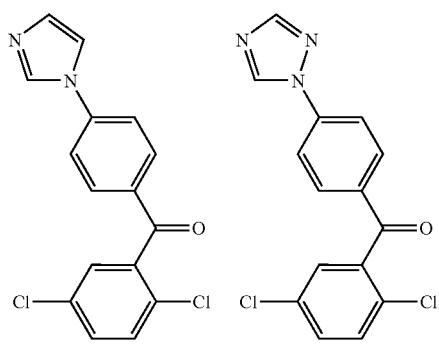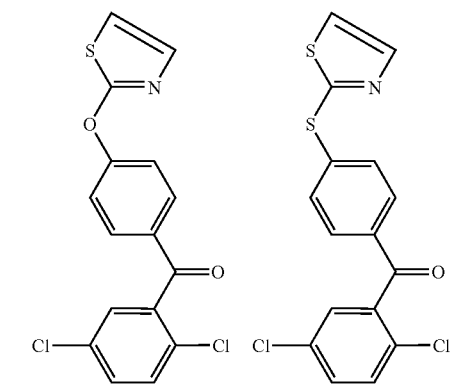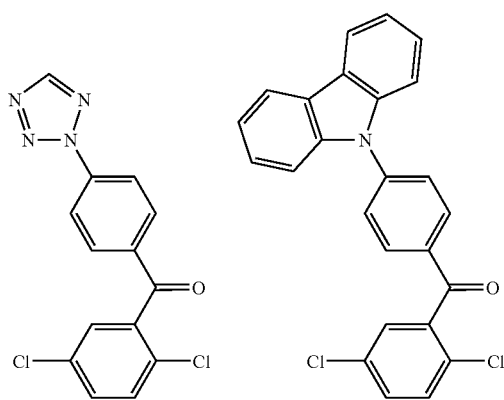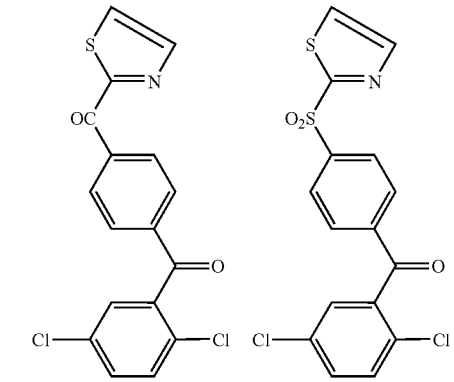
[Formula 35]
[Formula 36]
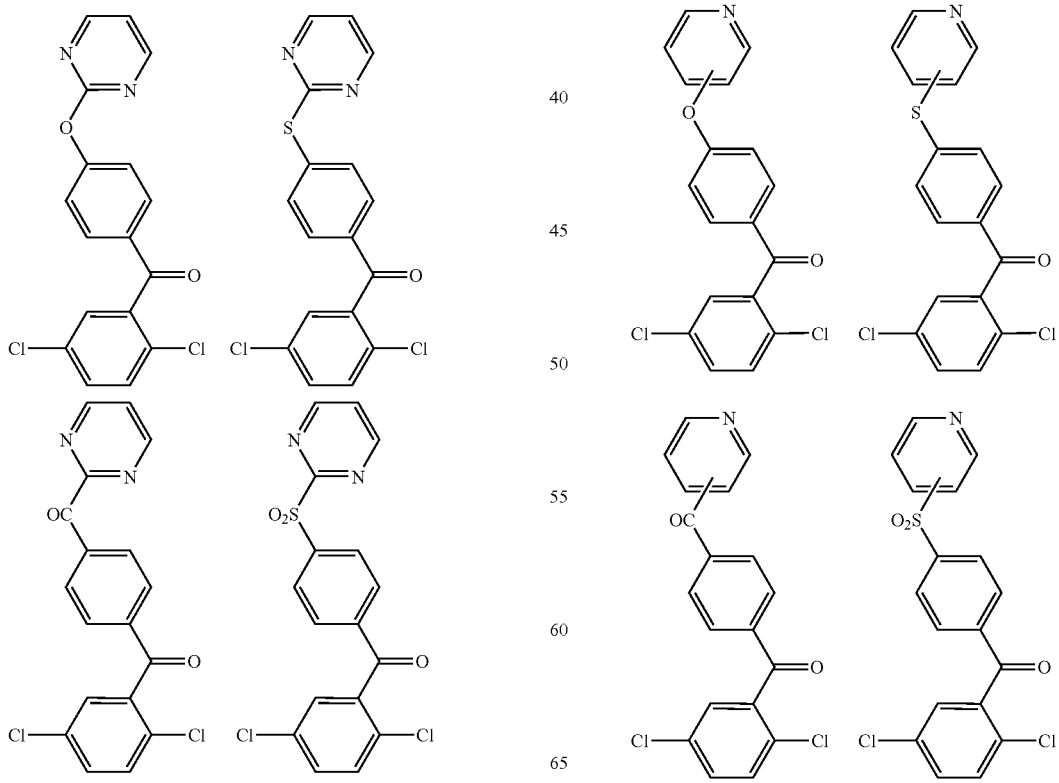

[Formula 37]

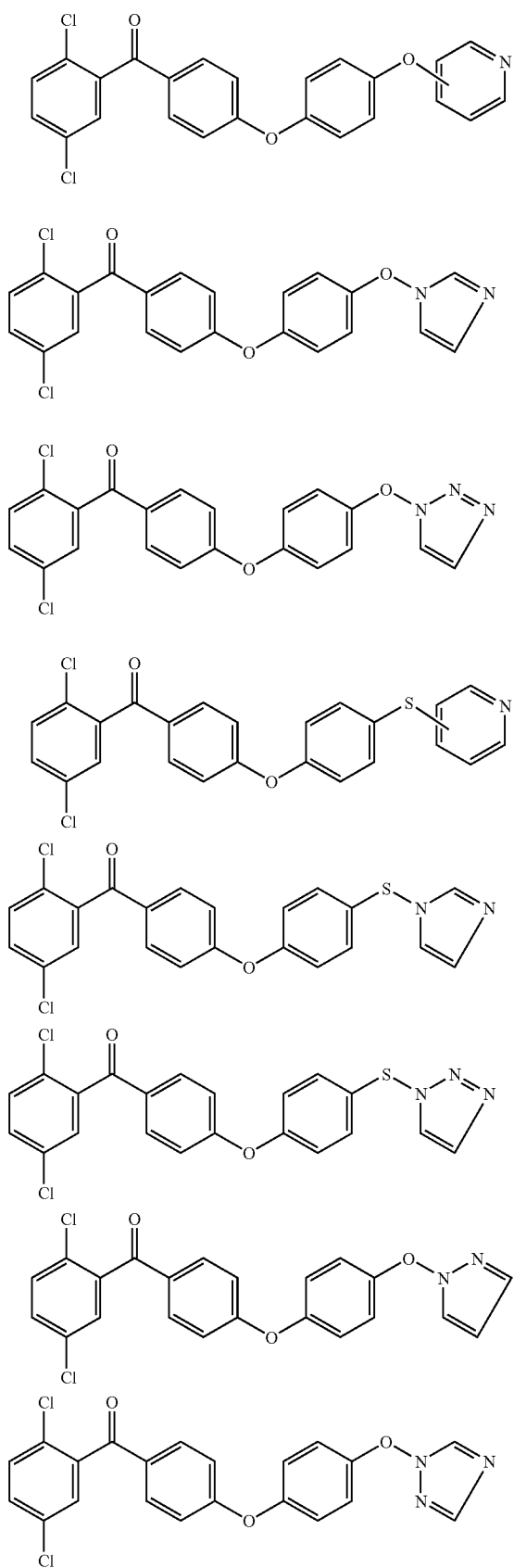

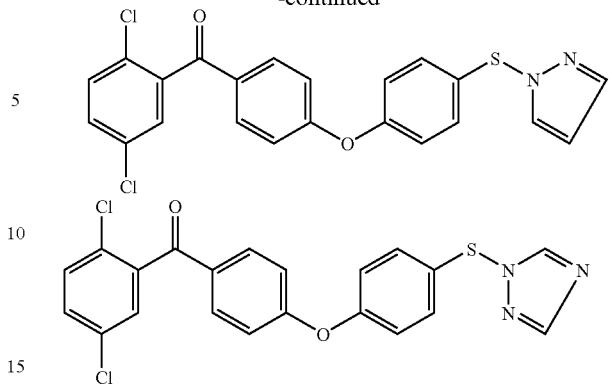

Also included are compounds in which chlorine atoms of the above-mentioned compounds are substituted by bromine atoms and compounds in which —CO— of the above-mentioned compounds is substituted by —SO$_2$—.

In order to obtain polyarylene having a sulfonic acid group, it is necessary to first obtain polyarylene serving as a precursor by copolymerizing a monomer that can be a structural unit represented by Formula (I) and a monomer or oligomer that can be a structural unit represented by Formula (II).

(Method C)

In Formula (I), when R$^{30}$ is an aromatic group having a substituent represented by —O(CH$_2$)$_p$SO$_3$H or —O(CF$_2$)$_p$SO$_3$H, the polyarylene having a sulfonic acid group can be synthesized by a method in which a monomer serving as a precursor that can be a structural unit represented by Formula (I) and a monomer or an oligomer that can be a structural unit represented by Formula (II) are copolymerized by the method described in Japanese Patent Application No. 2003-295974, and then an alkylsulfonic acid or a fluorine-substituted alkylsulfonic acid is introduced therein.

This copolymerization is carried out under the presence of a catalyst, and the catalyst used here is a catalyst system containing a transition metal compound. The catalyst system includes, as essential components, (1) a transition metal salt and a compound serving as a ligand (hereinafter, referred to as "ligand component") or a transition metal complex (including a copper salt) in which a ligand is coordinated and (2) a reducing agent, and further may include a "salt" for increasing the polymerization rate.

Specific examples of the catalyst component and their polymerization conditions, such as the ratio of each component used, the reaction solvent, concentration, temperature, and time, are those for the compound described in Japanese Patent Laid-open Publication No. 2001-342241.

The polyarylene having a sulfonic acid group can be obtained by converting a precursor, polyarylene, into polyarylene having a sulfonic acid group. As the methods for this, the following three methods are known.

(Method A) A precursor polyarylene having a sulfonic acid ester group is deesterified by the method described in Japanese Patent Laid-open Publication No. 2004-137444.

(Method B) A precursor polyarylene is sulfonated by the method described in Japanese Patent Laid-open Publication No. 2001-342241.

(Method C) An alkylsulfonic acid group is introduced in a precursor polyarylene by the method described in Japanese Patent Application No. 2003-295974.

The ion-exchange capacity of the polyarylene having a sulfonic acid group of Formula (3) produced by the method above is usually 0.3 to 5 meq/g, preferably 0.5 to 3 meq/g, and further preferably 0.8 to 2.8 meq/g. An ion-exchange capacity lower than 0.3 meq/g reduces the proton conductivity, resulting in a low power generation performance. On the other hand, an ion-exchange capacity higher than 5 meq/g may significantly reduce the water resistance, which is undesirable.

The above-mentioned ion-exchange capacity can be controlled by, for example, changing the types, ratios, and combination of a precursor monomer that can be the structural unit represented by Formula (I) and a monomer or oligomer that can be the structural unit represented by Formula (II).

The molecular weight of the thus-obtained polyarylene having a sulfonic acid group is 10000 to 1000000, preferably 20000 to 800000 as a weight-average molecular weight in terms of polystyrene measured by gel permeation chromatography (GPC).

The sulfonic acid-containing polyarylene may be used with an antioxidant, preferably a hindered phenol compound having a molecular weight of 500 or more. The use of the antioxidant can further enhance durability as an electrolyte.

Examples of the hindered phenol compound that can be used in the present invention include triethylene glycol-bis[3-(3-t-butyl-5-methyl-4-hydroxyphenyl)propionate] (trade name: IRGANOX 245), 1,6-hexanediol-bis[3-(3,5-di-t-butyl-4-hydroxyphenyl)propionate] (trade name: IRGANOX 259), 2,4-bis-(n-octylthio)-6-(4-hydroxy-3,5-di-t-butylanilino)-3,5-triazine (trade name: IRGANOX 565), pentaerythrityl-tetrakis[3-(3,5-di-t-butyl-4-hydroxyphenyl)propionate] (trade name: IRGANOX 1010), 2,2-thio-diethylene bis[3-(3,5-di-t-butyl-4-hydroxyphenyl)propionate] (trade name: IRGANOX 1035), octadecyl-3-(3,5-di-t-butyl-4-hydroxyphenyl)propionate) (trade name: IRGANOX 1076), N,N-hexamethylene bis(3,5-di-t-butyl-4-hydroxy-hydrocinnamamide) (IRGAONOX 1098), 1,3,5-trimethyl-2,4,6-tris(3,5-di-t-butyl-4-hydroxybenzyl)benzene (trade name: IRGANOX 1330), tris-(3,5-di-t-butyl-4-hydroxybenzyl)-isocyanurate (trade name: IRGANOX 3114), and 3,9-bis[2-{3-(3-t-butyl-4-hydroxy-5-methylphenyl)propionyloxy}-1,1-dimethylethyl]-2,4,8,10-tetraoxaspiro[5.5]undecane (trade name: Sumilizer GA-80).

In the present invention, the amount of the hindered phenol compound is preferably 0.01 to 10 parts by weight, based on 100 parts by weight of the sulfonic acid-containing polyarylene.

[Method for Producing Membrane]

The sulfonic acid-containing polyarylene copolymer of the present invention is composed of the above-described copolymer and is assumed to be used in a membrane form, solution form, or powder form, when the copolymer is used in, for example, a primary cell electrolyte, a secondary cell electrolyte, a fuel cell polymer solid electrolyte, a display element, various types of sensors, a signal transmission medium, a solid condenser, or an ion-exchange membrane. In these forms, a membrane form and a solution form are preferred (hereinafter, the membrane form is referred to as polymer electrolyte membrane).

The polymer electrolyte membrane of the present invention can be produced by, for example, a casting method in which the sulfonic acid-containing polyarylene copolymer is mixed in an organic solvent, and the mixture is casted on a substrate to be formed into a film form. Here, any substrate that is used in a usual solution casting method can be used without particular limitation. For example, a plastic substrate or a metal substrate is used, and a substrate made of a thermoplastic resin, such as a polyethylene terephthalate (PET) film, is preferably used.

The solvent for mixing the sulfonic acid-containing polyarylene copolymer may be any solvent that can dissolve or swell the copolymer, and examples thereof include non-proton polar solvents such as N-methyl-2-pyrrolidone, N,N-dimethylformamide, γ-butyrolactone, N,N-dimethylacetamide, dimethyl sulfoxide, dimethyl urea, dimethyl imidazolidinone, and acetonitrile; chlorinated solvents such as dichloromethane, chloroform, 1,2-dichloroethane, chlorobenzene, and dichlorobenzene; alcohols such as methanol, ethanol, propanol, iso-propyl alcohol, sec-butyl alcohol, and tert-butyl alcohol; alkylene glycol monoalkyl ethers such as ethylene glycol monomethyl ether, ethylene glycol monoethyl ether, and propylene glycol monoethyl ether; ketones such as acetone, methyl ethyl ketone, cyclohexanone, and γ-butyl lactone; and ethers such as tetrahydrofuran and 1,3-dioxane. These solvents may be used alone or in a combination of two or more. In particular, N-methyl-2-pyrrolidone (hereinafter, also referred to as "NMP") is preferred from the viewpoints of solubility and solution viscosity.

In addition, when the solvent is a mixture of a non-proton polar solvent and another solvent, the mixture has a composition in which the amount of the non-proton polar solvent is 95 to 25 wt %, preferably 90 to 25 wt % and the amount of the another solvent is 5 to 75 wt %, preferably 10 to 75 wt % (provided that the total is 100 wt %). An amount of the another solvent within the above-mentioned range is excellent in an effect of reducing the solution viscosity. A preferred combination of a non-proton polar solvent and another solvent is NMP serving as the non-proton polar solvent and methanol, which has an effect of reducing solution viscosity in a wide composition range as the another solvent.

The polymer concentration of a solution dissolving the copolymer and the additives depends on the molecular weight of the sulfonic acid-containing polyarylene copolymer and is usually 5 to 40 wt %, preferably 7 to 25 wt %. In a concentration smaller than 5 wt %, it is difficult to form a film with a sufficient thickness, and pinholes are readily generated. On the other hand, in a concentration larger than 40 wt %, it is difficult to form a film because of its too high solution viscosity, and the resulting film may lack in surface smoothness.

In addition, the solution viscosity depends on the molecular weight of the sulfonic acid-containing polyarylene copolymer and the concentrations of the polymer and additives and is usually, 2000 to 100000 mPa·s, preferably 3000 to 50000 mPa·s. In a solution viscosity of 2000 mPa·s, the solution is poor in retention properties during forming a film, resulting in a possibility of flowing out from the substrate. On the other hand, in a solution viscosity larger than 100000 mPa·s, the solution cannot be extruded from a die because of its too high viscosity, resulting in a difficulty in formation of a film by a casting method.

After the formation of the film as in above, the resulting undried film is immersed in water to substitute the organic solvent in the undried film by water, resulting in a reduction in the amount of the remaining solvent in the resulting polymer electrolyte membrane.

In addition, after the formation of the film, the undried film may be pre-dried before being immersed in water. The pre-drying is usually carried out by holding the undried film at a temperature of 50 to 150° C. for 0.1 to 10 hours.

The immersing of the undried film (including the pre-dried film, hereinafter the same shall apply) in water may be carried out by a batch system in which sheets are immersed in water or by a continuous system in which a laminate film formed on a substrate film (for example, PET) is, directly or after detached from the substrate, immersed in water while being rolled out. In the batch system, in order to prevent the film surface after the treatment from becoming wrinkled, the undried film is preferably immersed in water by a method in which, for example, the undried film is set to a frame.

The amount of water in which the undried film is immersed is 10 parts by weight or more, preferably 30 parts by weight or more, and more preferably 50 parts by weight or more based on one part by weight of the undried film. When the amount of water used is within the above-mentioned range, the amount of remaining solvent in the resulting proton-conducting membrane can be reduced. Furthermore, the constant maintaining of the concentration of the organic solvent in the water to a level lower than a certain concentration by exchanging the water used in the immersion or allowing the water to overflow is effective to reduce the amount of the remaining solvent in the resulting polymer electrolyte membrane. In addition, in order to reduce the in-plane distribution of the amount of the organic solvent remaining in the polymer electrolyte membrane, it is effective to uniformize the concentration of the organic solvent in the water by, for example, stirring.

The temperature of water when the undried film is immersed therein is usually within a range of 5 to 80° C., preferably 10 to 60° C., from the standpoints of the substitution rate and handleability. A higher temperature makes the substitution rate between an organic solvent and water higher, but the amount of water absorbed by the film is also increased, which may deteriorate the surface conditions of the dried polymer electrolyte membrane. The time for immersing the film depends on the initial amount of the remaining solvent, the amount of water used, and the treatment temperature and is usually within a range of 10 minutes to 240 hours, preferably 30 minutes to 100 hours.

A membrane having a reduced remaining solvent amount is obtained by drying the undried film after being immersed in water as in above. The amount of the remaining solvent in thus-obtained membrane is usually 5 wt % or less. Furthermore, the amount of the remaining solvent in the membrane can be reduced to 1 wt % or less by controlling the immersing conditions. An example of such conditions is an amount of water used of 50 parts by weight or more based on one part by weight of the undried film, a water temperature for immersion of 10 to 60° C., and an immersion time of 10 minutes to 10 hours.

After the immersing of the undried film in water as in above, the film is dried at 30 to 100° C., preferably 50 to 80° C., for 10 to 180 minutes, preferably 15 to 60 minutes, and then is vacuum-dried at 50 to 150° C., preferably under a reduced pressure of 500 to 0.1 mmHg, for 0.5 to 24 hours to give a membrane.

The polymer electrolyte membrane obtained by the method of the present invention usually has a dried thickness of 10 to 100 µm, preferably 20 to 80 µm.

In addition, the polymer electrolyte membrane according to the present invention can be produced by forming the above-mentioned polyarylene copolymer having a sulfonic acid ester group or an alkali metal salt of sulfonic acid into a film form by the method as described above and then subjecting the film to suitable post-treatment such as hydrolysis or acid treatment.

In addition, when the polymer electrolyte membrane is produced, the sulfonic acid group-containing polyarylene copolymer may be used together with, for example, an inorganic acid such as sulfuric acid or phosphoric acid; inorganic proton conductive particles made of, for example, phosphate glass, tungstic acid, phosphate hydrate, a β-aluminum-proton substitution, or a proton introducing oxide; an organic acid including carboxylic acid, sulfonic acid, or phosphorous acid; or a proper amount of water.

EXAMPLES

The present invention will be further specifically described with reference to examples below, but is not limited to the following examples. Various measurement items in the examples were determined as follows. In the examples, the sulfonated polymer films used in various measurements were produced by dissolving a sulfonated polymer in an N-methylpyrrolidone/methanol solution and then by a casting method. In addition, in the examples, "%" means "% by weight" unless otherwise specified.

[Weight Average Molecular Weight]

The number average molecular weight (Mn) and the weight average molecular weight (Mw) of a copolymer were determined as molecular weights in terms of polystyrene using an NMP buffer solution as the solvent by gel permeation chromatography (GPC). The NMP buffer solution was prepared at a ratio of NMP (3 L)/phosphoric acid (3.3 mL)/lithium bromide (7.83 g).

[Sulfonic Acid Group Equivalent]

The resulting sulfonated polymer was washed with distilled water until the washing water was neutral for removing the remaining free acid and then was dried. Then, a predetermined amount of the polymer was weighed and was dissolved in a solvent mixture of THF/water. The resulting solution was titrated with a NaOH standard solution using phenolphthalein as an indicator, and the equivalent (ion-exchange capacity) (meq/g) of the sulfonic acid group was determined from the neutralization point.

[Measurement of Rupture Strength and Elastic Modulus]

The measurements of rupture strength and elastic modulus were carried out according to JIS K7113 (tension rate: 50 mm/min). However, the elastic modulus was calculated by using a distance between marked lines as the chuck distance. According to JIS K7113, condition adjustment of specimens was carried out under conditions of a temperature of 23±2° C. and a relative humidity of 50±5% for 48 hours. The specimens were punched with a dumbbell No. 7 described in JIS K6251. As the measurement apparatus for the tension test, model 5543 manufactured by INSTRON was used.

[Measurement of Proton Conductivity]

The AC resistance was determined by pressing platinum needles (f=0.5 mm) to a surface of strip-like specimen membrane having a 5 mm width, holding the specimen in a constant temperature and humidity apparatus, and measuring the AC impedance between the platinum needles. That is, impedance at an AC of 10 kHz under the circumstance of at a temperature of 85° C. and a relative humidity of 90% was measured. As the apparatus for measuring the resistance, a chemical impedance measurement system manufactured by NF Corporation was used. As the constant temperature and humidity apparatus, JW241 manufactured by Yamato Scientific Co., Ltd. was used. The AC resistance was measured by pressing five platinum needles at an interval of 5 mm and varying the distance between the needles from 5 mm to 20 mm. The specific resistance of the membrane was calculated from the needle distances and the resistance gradient, and the proton conductivity was calculated from the reciprocal of the specific resistance.

Specific resistance $R$ ($\Omega \cdot cm$)=0.5 (cm)×membrane thickness (cm)×resistance gradient between needles ($\Omega/cm$)

[Heat Resistance Test]

A film cut into a 2 cm×3 cm piece was laid between Bemcot and put in a glass test tube and was heated in a compact precise constant temperature chamber (AWC-2) under air conditions at 160° C. for 24 hours. The heated film was dissolved in an NMP buffer solvent at a concentration of 0.2 wt % and was measured for molecular weight and area size (A24) with GPC (NMP buffer solvent) (HCL-8220, manufactured by Tosoh Corp.). The film before the heating was also measured for molecular weight and area size (A0) under the same conditions, and a change in molecular weight and insoluble ratio defined by the following equation were determined.

Insoluble ratio (%)=($A24$–$A0$)/($A0$).

The NMP buffer solution was prepared at a ratio of NMP (3 L)/phosphoric acid (3.3 mL)/lithium bromide (7.83 g).

Example 1

Synthesis of Sulfonic Acid Unit

In a 2-L three-necked flask equipped with a stirring blade, a thermometer, and a nitrogen inlet tube, 2306.4 g (24 mol) of fluorobenzene was placed and was cooled to 10° C. in an ice bath, followed by gradual addition of 1005.4 g (4.8 mol) of 2,5-dichlorobenzoyl chloride and 832.1 g (6.3 mol) of aluminum chloride while controlling the reaction temperature not to exceed 40° C. After the addition, the mixture was stirred at 40° C. for 8 hours. After the completion of the reaction, the mixture was dropwise added to ice water, followed by extraction with ethyl acetate. After neutralization with 1% sodium hydrogen carbonate aqueous solution, the extract was washed with saturated saline, followed by concentration. Recrystallization from methanol was carried out to obtain the compound of Formula (30-1) below. The yield was 1033 g.

In a 7-L three-necked flask equipped with a stirrer, a thermometer, a cooling tube, a Dean-Stark tube, and a nitrogen introducing three-way cock, 1323.6 g (4.9 mol) of the compound of Formula (30-1) below, 467.9 g (4.9 mol) of 2-hydroxypyridine, and 748.0 g (5.4 mol) of potassium carbonate were placed, and 5 L of N,N-dimethylacetamide (DMAc) and 1 L of toluene were added thereto. The mixture was heated in an oil bath under a nitrogen atmosphere and was subjected to a reaction at 130° C. under stirring. The reaction was carried out, while removing the water generated by the reaction by azeotroping with toluene to the outside of the system via the Dean-Stark tube. The generation of water was substantially not recognized after about three hours of the azeotrope.

Then, most of the toluene was removed, and the reaction was continued for 10 hours at 130° C. The resulting reaction solution was allowed to cool, and a filtrate was put into 20 L of water/methanol (9/1). The precipitated product was collected by filtration and dried. The dried product was placed in a 7-L three-necked flask equipped with a stirrer, a thermometer, a cooling tube, a Dean-Stark tube, and a nitrogen introducing three-way cock and was dissolved in 5 L of toluene under stirring at 100° C. for distilling off the remaining water. After allowed to cool, the crystallized substance was collected by filtration to obtain the objective compound (30-2). The yield was 1300 g.

In a 5-L three-necked flask equipped with a stirrer, a thermometer, a cooling tube, and a nitrogen introducing three-way cock, 585.1 g (1.7 mol) of the compound of Formula (30-2) below was dissolved in 387 g of concentrated sulfuric acid, and the solution was cooled to 20° C. with ice. Then, 1062.5 g of fuming sulfuric acid (60%) was gradually added thereto, followed by stirring at 90° C. for 8 hours. After the completion of the reaction, the mixture was dissolved in ice and neutralized with a sodium hydroxide aqueous solution. Water was removed by concentration, followed by dissolving in dimethyl sulfoxide. Insoluble substances were removed by filtration. The soluble fraction was concentrated and was dissolved in a small amount of dimethyl sulfoxide and coagulated in acetone. The solid was collected by filtration to obtain the objective compound (30-3). The yield was 745 g. In a 5-L three-necked flask equipped with a stirrer, a thermometer, a cooling tube, and a nitrogen introducing three-way cock, 1054 g (1.9 mol) of the compound of Formula (30-3) below was dissolved in 1 L of sulfolane, and then 920 g of phosphoryl chloride was gradually dropwise added thereto. After the completion of the dropwise addition, the mixture was stirred at 70° C. for 8 hours, and the reaction solution was dropwise added to ice, followed by extraction with ethyl acetate. After neutralization with sodium hydrogen carbonate aqueous solution, the extract was washed with saturated saline and dried over magnesium sulfate. After concentrating the solvent, coagulation in hexane was performed to obtain the objective compound (30-4). The yield was 373 g.

In a 1-L three-necked flask equipped with a stirring blade, a thermometer, and a nitrogen inlet tube, 324.7 g (0.6 mol) of the compound of Formula (30-4) below and 105.8 g (1.2 mol) of neopentyl alcohol were dissolved in 378 g of pyridine, followed by reaction at 5 to 10° C. for 8 hours. After the completion of the reaction, the mixture was dropwise added to 1% hydrochloric acid ice water, followed by extraction with ethyl acetate. After neutralization with 1% sodium hydrogen carbonate aqueous solution, the extract was washed with saturated saline, followed by concentration. Recrystallization from ethyl acetate/methanol was carried out to obtain the compound of Formula (30-5) below. The yield was 193 g.

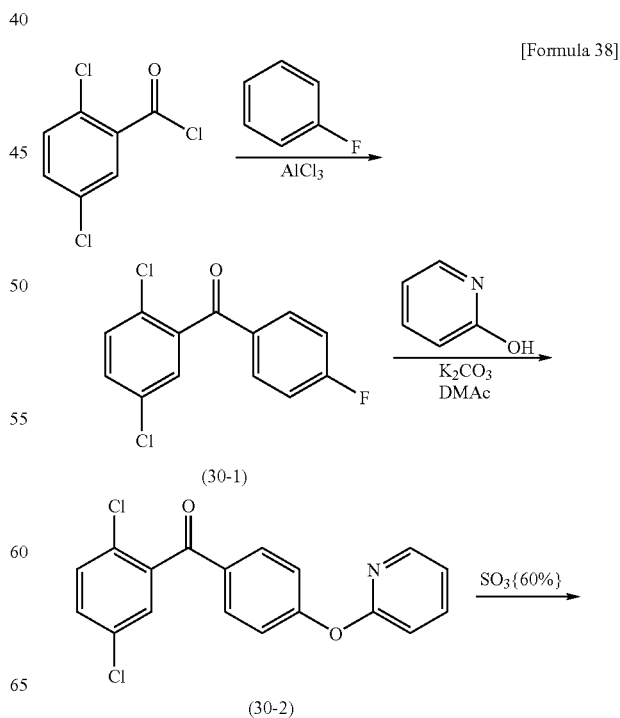

[Formula 38]

-continued

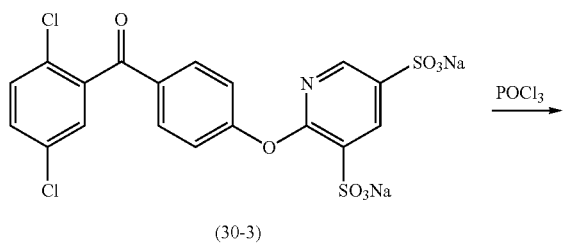

(30-3)

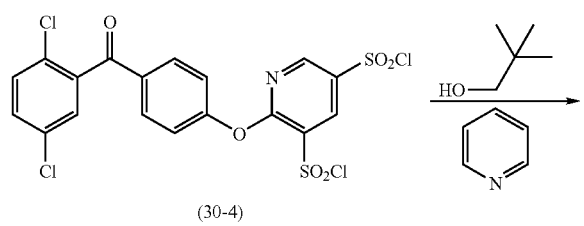

(30-4)

the system via the Dean-Stark tube. The generation of water was substantially not recognized after about three hours. The reaction temperature was gradually raised from 130° C. to 150° C. Meanwhile, most of the toluene was removed, while gradually raising the reaction temperature to 150° C., and the reaction was continued at 150° C. for 10 hours. Then, 10.0 g (0.040 mol) of 4,4'-DCBP was added thereto, and the reaction was further continued for 5 hours. The resulting reaction solution was allowed to cool. Then, the by-product inorganic compound deposit was removed by filtration, and the filtrate was put into 4 L of methanol. The precipitated product was collected by filtration and dried. The dried product was dissolved in 300 mL of tetrahydrofuran. This was reprecipitated from 4 L of methanol to obtain 95 g of the objective compound (yield: 85%).

The Mn in terms of polystyrene of the resulting copolymer measured by GPC (THF solvent) was 11200. The resulting compound was the oligomer represented by Formula (30-6).

[Formula 39]

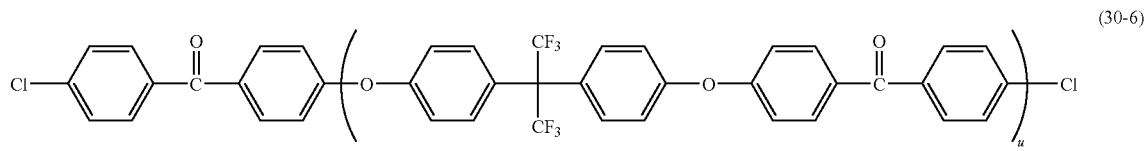

(30-6)

-continued

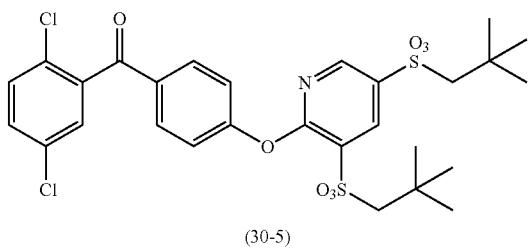

(30-5)

<Synthesis of Hydrophobic Unit>

In a 1-L three-necked flask equipped with a stirrer, a thermometer, a cooling tube, a Dean-Stark tube, and a nitrogen introducing three-way cock, 67.3 g (0.20 mol) of 2,2-bis(4-hydroxyphenyl)-1,1,1,3,3,3-hexafluoropropane, 60.3 g (0.24 mol) of 4,4'-dichlorobenzophenone (4,4'-DCBP), 71.9 g (0.52 mol) of potassium carbonate, 300 mL of N,N-dimethylacetamide (DMAc), and 150 mL of toluene were placed. The mixture was heated in an oil bath under a nitrogen atmosphere and was subjected to a reaction at 130° C. under stirring. The reaction was carried out, while removing the water generated by the reaction by azeotroping with toluene to the outside of <Synthesis of Polymer>

The dried DMAc (239 mL) was added, under nitrogen, to a mixture of 62.27 g (96.6 mmol) of the compound represented by Formula (30-5) above, 38.08 g (3.4 mmol) of a hydrophobic unit synthesized as Formula (30-6) above, 3.27 g (5.0 mmol) of bis(triphenylphosphine)nickel dichloride, 10.49 g (40 mmol) of triphenylphosphine, 0.45 g (3.0 mmol) of sodium iodide, and 15.69 g (240 mmol) of zinc.

The reaction system was heated under stirring (finally, up to 79° C.), and the reaction was carried out for 3 hours. During the reaction, an increase in viscosity of the system was observed. The polymerization reaction solution was diluted with 658 mL of DMAc, and the solution was stirred for 30 minutes and then was filtrated using Celite as a filter aid.

To the filtrate, 50.34 g (579.6 mmol) of lithium bromide was added. The reaction was carried out at an internal temperature of 110° C. for 7 hours under a nitrogen atmosphere. After the reaction, the mixture was cooled to room temperature and was put into 3.5 L of water for coagulation. The coagulated substance was immersed in acetone, followed by filtration and washing. The washed substance was washed with 1.7 kg of 1N sulfuric acid under stirring. After filtration, the product was washed with ion-exchange water until the pH of the washing solution became higher than 5. The measurement of molecular weights of the resulting polymer by GPC showed an Mn of 53000 and an Mw of 105000. The ion-exchange capacity was 2.28 meq/g. The resulting polymer was represented by Formula (30-7) below.

[Formula 40]

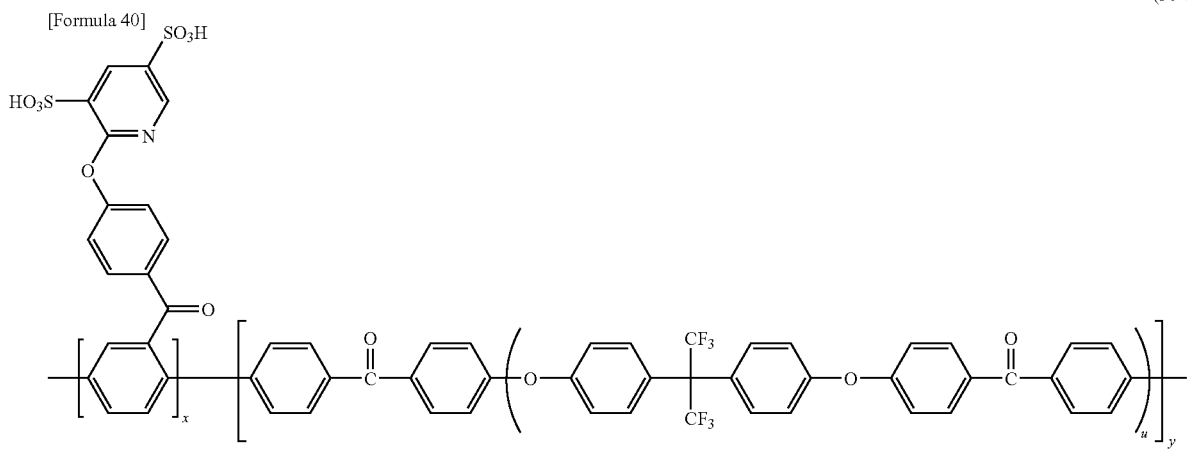

(30-7)

Example 2

Synthesis of Hydrophobic Unit

In a 1-L three-necked flask equipped with a stirrer, a thermometer, a Dean-Stark tube, a nitrogen inlet tube, and a cooling tube, 154.8 g (0.9 mol) of 2,6-dichlorobenzonitrile, 269.0 g (0.8 mol) of 2,2-bis(4-hydroxyphenyl)-1,1,1,3,3,3-hexafluoropropane, and 143.7 g (1.04 mol) of potassium carbonate were weighed. After nitrogen substitution, 1020 mL of sulfolane and 510 mL of toluene were added thereto, followed by stirring. The reaction solution was heated to reflux at 150° C. in an oil bath. The water generated by the reaction was trapped with the Dean-Stark tube. When substantially no generation of water was recognized after 3 hours, the toluene was removed to the outside of the system via the Dean-Stark tube. The reaction temperature was gradually raised to 200° C., and the stirring was continued for 3 hours, followed by addition of 51.6 g (0.3 mol) of 2,6-dichlorobenzonitrile. The reaction was further continued for 5 hours.

The reaction solution was allowed to cool and was then diluted with 250 mL of toluene. Inorganic salts insoluble to the reaction solution were removed by filtration, and the filtrate was poured into 8 L of methanol to precipitate the product. The precipitated product was collected by filtration and dried and was then dissolved in 500 mL of tetrahydrofuran. The solution was poured into 5 L of methanol for reprecipitation. The precipitated white powder was collected by filtration and dried to obtain 258 g of the objective compound. The Mn thereof measured by GPC was 7500. The resulting compound was confirmed to be an oligomer represented by Formula (30-8).

[Formula 41]

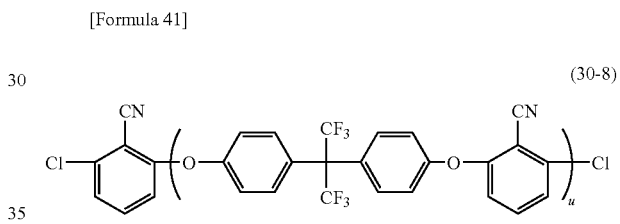

(30-8)

<Synthesis of Polymer>

The same procedure as in Example 1 was performed except that 61.24 g (95.0 mmol) of the compound of Formula (30-5), 37.50 g (5.0 mmol) of the hydrophobic unit of Formula (30-8), and 49.50 g (570 mmol) of lithium bromide were used.

The measurement of molecular weights of the resulting polymer by GPC showed an Mn of 41000 and an Mw of 84000. The ion-exchange capacity was 2.30 meq/g. The resulting polymer was represented by Formula (30-9) below.

[Formula 42]

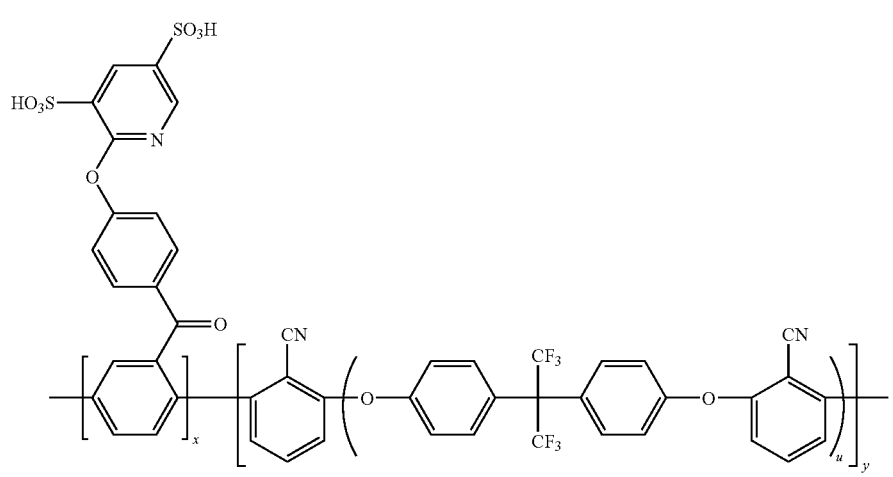

(30-9)

Example 3

Synthesis of Hydrophobic Unit

In a 1-L separable three-necked flask equipped with a stirring blade, a thermometer, a nitrogen inlet tube, a Dean-Stark tube, and a cooling tube, 52.4 g (240 mmol) of 4,4'-difluorobenzophenone, 14.1 g (60.0 mmol) of 4-chloro-4'-fluorobenzophenone, 70.2 g (203 mmol) of 4,4'-(1,3-phenylenediisopropylidene)bisphenol, 23.7 g (67.5 mmol) of bis(4-hydroxyphenyl)fluorene, and 48.5 g (351 mmol) of potassium carbonate were weighed, followed by addition of 430 mL of DMAc and 220 mL of toluene. The mixture was heated to reflux at 150° C. under a nitrogen atmosphere. The water generated by the reaction was removed by azeotroping with toluene via the Dean-Stark tube. When substantially no generation of water was recognized after 3 hours, the toluene was removed to the outside of the system. The stirring was continued at 160° C. for 7 hours, followed by addition of 7.0 g (20.0 mmol) of 4-chloro-4'-fluorobenzophenone. The stirring was further continued for 3 hours.

After allowed to cool, inorganic substances insoluble to the reaction solution were removed by filtration using Celite as a filter aid. The filtrate was poured into 2.0 L of methanol to coagulate the reaction product. The precipitated coagulum was collected by filtration, washed with a small amount of methanol, and vacuum-dried. The dried product was redissolved in 200 mL of tetrahydrofuran. The solution was poured into 2.0 L of methanol for reprecipitation. The coagulum was collected by filtration and vacuum-dried to obtain 110 g of the objective compound (yield: 80%). The Mn in terms of polystyrene measured by GPC was 6000. The resulting compound was confirmed to be an oligomer represented by Formula (30-10).

[Formula 43]

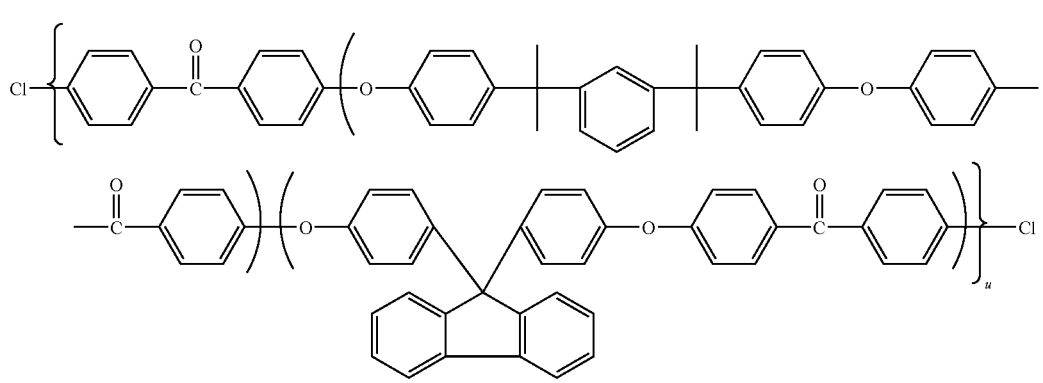

(30-10)

<Synthesis of Polymer>

The same procedure as in Example 1 was performed except that 60.46 g (93.8 mmol) of the compound of Formula (30-5), 37.20 g (6.2 mmol) of the hydrophobic unit of Formula (30-10), and 48.88 g (563 mmol) of lithium bromide were used.

The measurement of molecular weights of the resulting polymer by GPC showed an Mn of 39000 and an Mw of 88000. The ion-exchange capacity was 2.29 meq/g. The resulting polymer was represented by Formula (30-11) below.

[Formula 44]

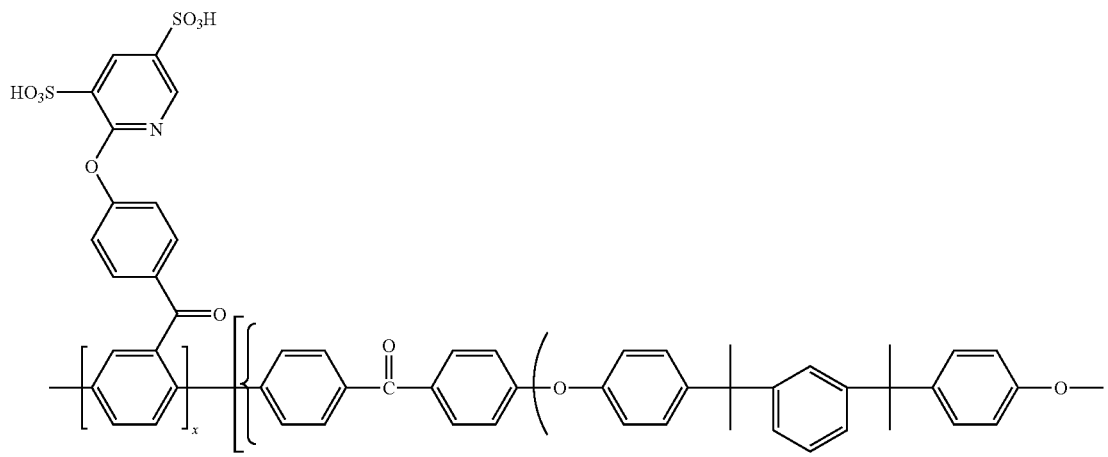

(30-11)

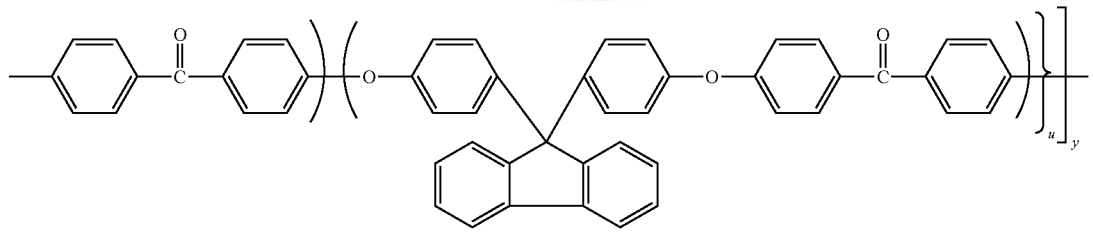

Example 4

Synthesis of Hydrophobic Unit

In a 3-L separable three-necked flask equipped with a stirring blade, a thermometer, a nitrogen inlet tube, a Dean-Stark tube, and a cooling tube, 207.81 g (952 mmol) of 4,4'-difluorobenzophenone, 42.46 g (181 mmol) of 4-chloro-4'-fluorobenzophenone, 103.8 g (943 mmol) of resorcinol, 36.7 g (105 mmol) of bis(4-hydroxyphenyl)fluorene, and 173.8 g (1.3 mol) of potassium carbonate were weighed, followed by addition of 1250 mL of DMAc and 500 mL of toluene. The mixture was heated to reflux at 150° C. under a nitrogen atmosphere. The water generated by the reaction was removed by azeotroping with toluene via the Dean-Stark tube. When no generation of water was recognized after 3 hours, the toluene was removed to the outside of the system.

The stirring was continued at 160° C. for 7 hours, followed by addition of 12.3 g (52.0 mmol) of 4-chloro-4'-fluorobenzophenone. The stirring was further continued for 3 hours.

After allowed to cool, inorganic substances insoluble to the reaction solution were removed by filtration using Celite as a filter aid. The filtrate was poured into 5.0 L of methanol to coagulate the reaction product. The precipitated coagulum was collected by filtration, washed with a small amount of methanol, and vacuum-dried. The dried product was redissolved in 810 mL of tetrahydrofuran. The solution was poured into 3.2 L of methanol for reprecipitation. The coagulum was collected by filtration and vacuum-dried to obtain 261 g of the objective compound (yield: 75%). The Mn in terms of polystyrene measured by GPC was 4000. The resulting compound was confirmed to be an oligomer represented by Formula (30-12).

[Formula 45]

(30-12)

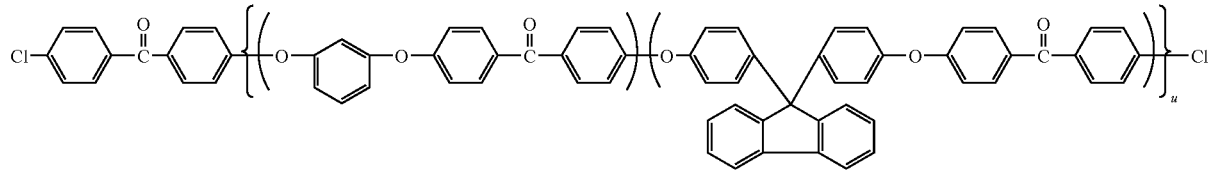

Synthesis of Polymer

The same procedure as in Example 1 was performed except that 58.59 g (90.9 mmol) of the compound of Formula (30-5), 36.40 g (9.1 mmol) of the hydrophobic unit of Formula (30-12), and 47.37 g (545 mmol) of lithium bromide were used.

The measurement of molecular weights of the resulting polymer by GPC showed an Mn of 29000 and an Mw of 63000. The ion-exchange capacity was 2.27 meq/g. The resulting polymer was represented by Formula (30-13) below.

[Formula 46]

(30-13)

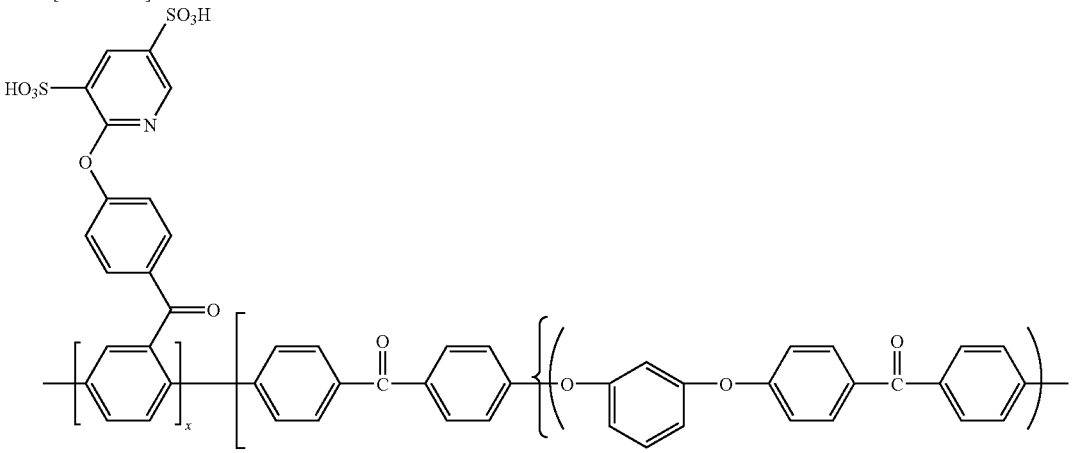

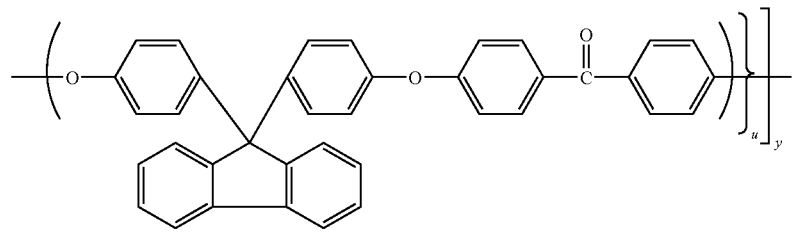

Example 5

A monomer was prepared as in Example 1 except that imidazole was used instead of 2-hydroxypyridine in Example 1. The resulting compound was confirmed to be a monomer represented by Formula (40-1).

[Formula 47]

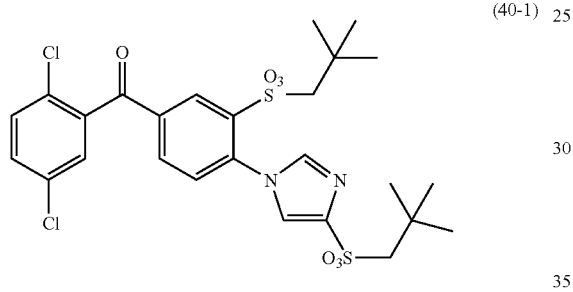

(40-1)

A polymer was synthesized as in Example 1 using 59.53 g (96.4 mmol) of the compound of Formula (40-1), 40.32 g (3.6 mmol) of the hydrophobic unit of Formula (30-6), and 50.23 g (578 mmol) of lithium bromide.

The measurement of molecular weights of the resulting polymer by GPC confirmed to be an Mn of 32000 and an Mw of 54000. The ion-exchange capacity was 2.26 meq/g. The resulting polymer was represented by Formula (40-2) below.

[Formula 48]

Example 6

The same procedure as in Example 1 was performed except that 58.48 g (94.7 mmol) of the compound of Formula (40-1), 39.75 g (5.3 mmol) of the hydrophobic unit of Formula (30-8), and 49.35 g (568 mmol) of lithium bromide were used.

The measurement of molecular weights of the resulting polymer by GPC showed an Mn of 40000 and an Mw of 73000. The ion-exchange capacity was 2.27 meq/g. The resulting polymer was represented by Formula (40-3) below.

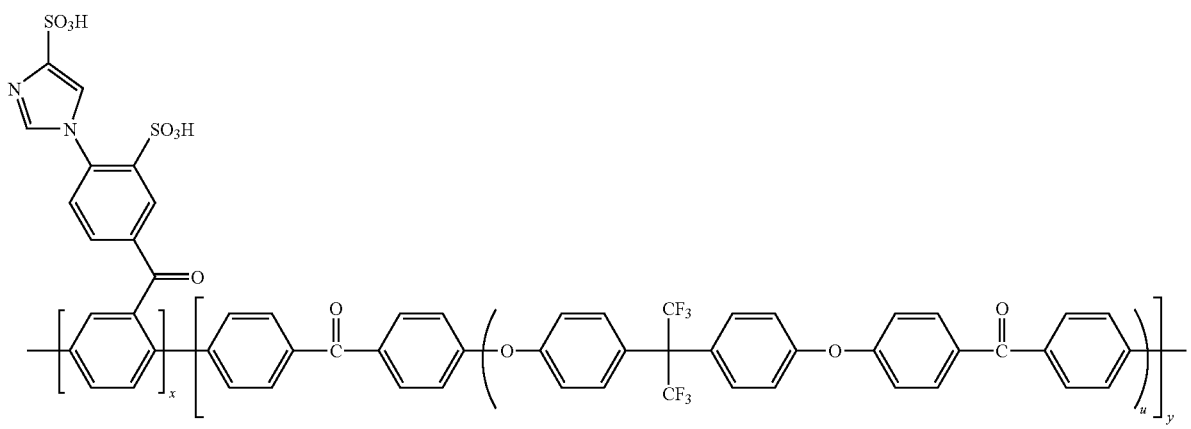

(40-2)

[Formula 49]

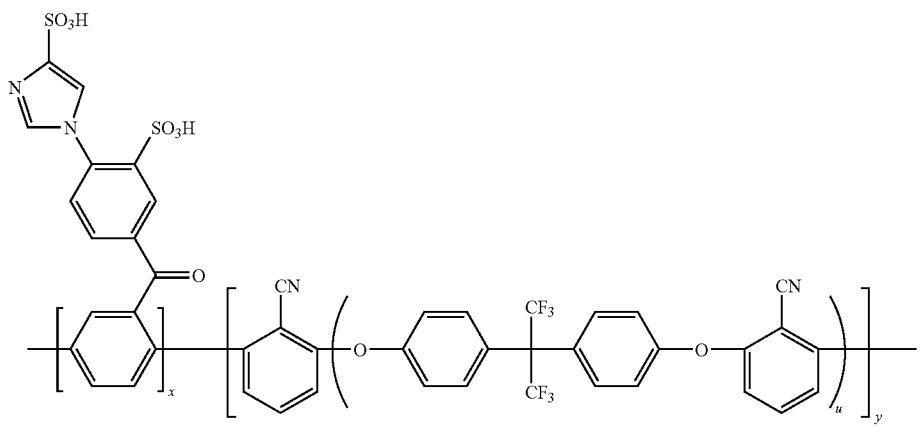

(40-3)

Example 7

The same procedure as in Example 1 was performed except that 57.68 g (93.4 mmol) of the compound of Formula (40-1), 39.62 g (6.6 mmol) of the hydrophobic unit of Formula (30-10), and 48.67 g (560 mmol) of lithium bromide were used.

The measurement of molecular weights of the resulting polymer by GPC showed an Mn of 45000 and an Mw of 93000. The ion-exchange capacity was 2.27 meq/g. The resulting polymer was represented by Formula (40-4) below.

Example 8

The same procedure as in Example 1 was performed except that 55.83 g (90.4 mmol) of the compound of Formula (40-1), 38.40 g (9.6 mmol) of the hydrophobic unit of Formula (30-12), and 47.11 g (542 mmol) of lithium bromide were used.

The measurement of molecular weights of the resulting polymer by GPC showed an Mn of 32000 and an Mw of 60000. The ion-exchange capacity was 2.27 meq/g. The resulting polymer was represented by Formula (40-5) below.

[Formula 50]

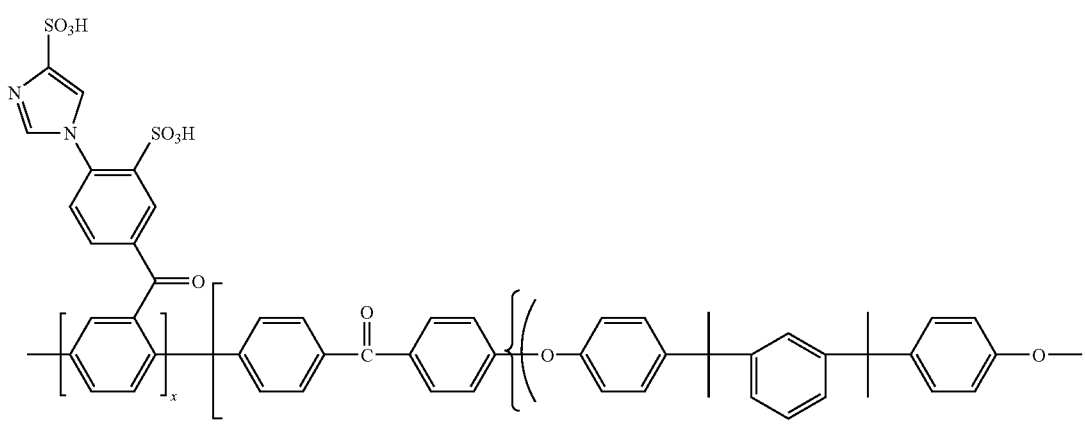

(40-4)

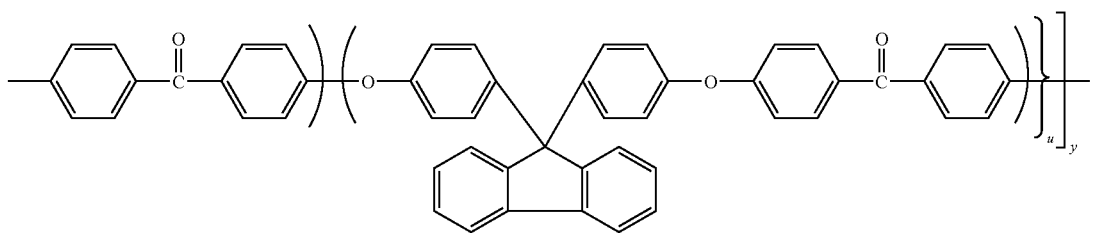

(40-5)

[Formula 51]

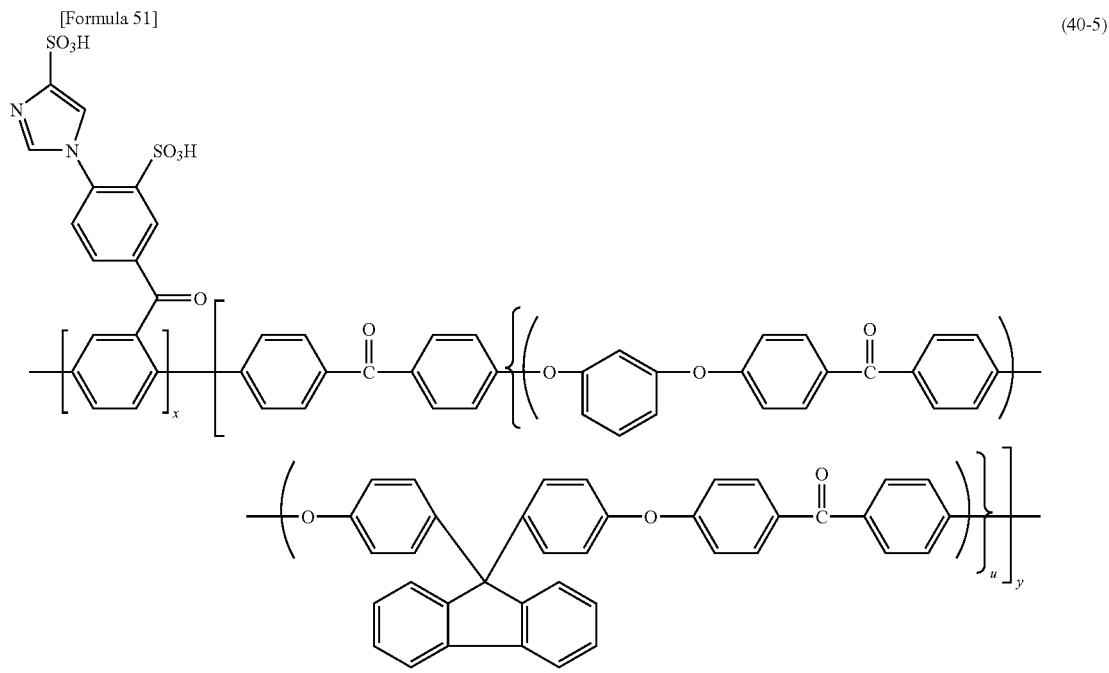

Example 9

The compound of Formula (50-1) below was prepared by a reaction of dichlorobenzene and nicotinoyl chloride in the presence of aluminum chloride. Sulfonation by fuming sulfuric acid, chlorosulfonation by phosphoryl chloride, and esterification by neopentyl alcohol were carried out as in Example 1 to obtain the compound of Formula (50-2) below.

[Formula 52]

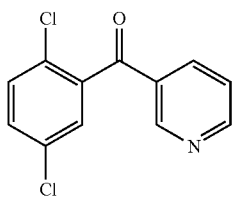

(50-1)

[Formula 53]

-continued

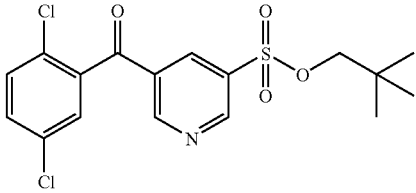

(50-2)

The polymer synthesis was carried out as in Example 1 except that 39.69 g (98.7 mmol) of the compound of Formula (50-2), 15.12 g (1.4 mmol) of the hydrophobic unit of Formula (30-6), and 25.70 g (296 mmol) of lithium bromide were used.

The measurement of molecular weights of the resulting polymer by GPC showed an Mn of 34000 and an Mw of 67000. The ion-exchange capacity was 2.26 meq/g. The resulting polymer was represented by Formula (50-3) below.

[Formula 54]

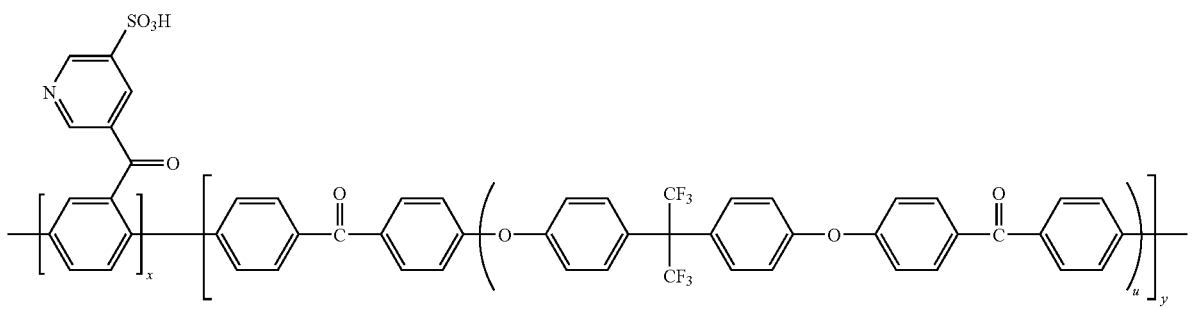

(50-3)

Example 10

The polymer synthesis was carried out as in Example 1 except that 39.42 g (98.0 mmol) of the compound of Formula (50-2), 15.0 g (2.0 mmol) of the hydrophobic unit of Formula (30-8), and 25.53 g (294 mmol) of lithium bromide were used.

The measurement of molecular weights of the resulting polymer by GPC showed an Mn of 33000 and an Mw of 70000. The ion-exchange capacity was 2.25 meq/g. The resulting polymer was represented by Formula (50-4) below.

Example 12

The polymer synthesis was carried out as in Example 1 except that 38.74 g (96.3 mmol) of the compound of Formula (50-2), 14.80 g (3.7 mmol) of the hydrophobic unit of Formula (30-12), and 25.09 g (289 mmol) of lithium bromide were used.

The measurement of molecular weights of the resulting polymer by GPC showed an Mn of 32000 and an Mw of 66000. The ion-exchange capacity was 2.26 meq/g. The resulting polymer was represented by Formula (50-6) below.

[Formula 55]

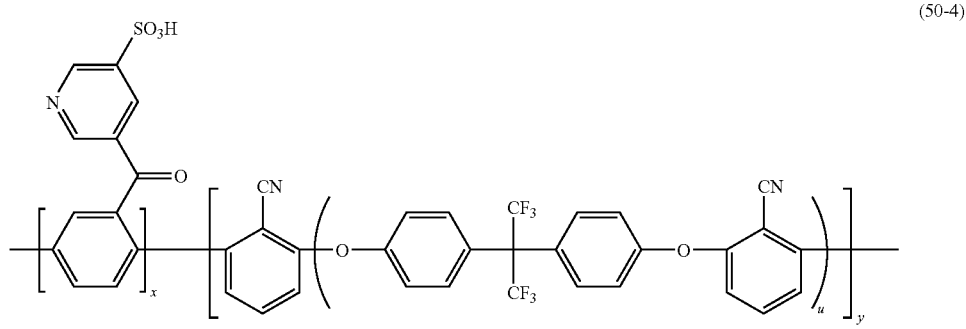

(50-4)

Example 11

The polymer synthesis was carried out as in Example 1 except that 39.22 g (97.5 mmol) of the compound of Formula (50-2), 15.00 g (2.5 mmol) of the hydrophobic unit of Formula (30-10), and 25.40 g (293 mmol) of lithium bromide were used.

The measurement of molecular weights of the resulting polymer by GPC showed an Mn of 42000 and an Mw of 81000. The ion-exchange capacity was 2.29 meq/g. The resulting polymer was represented by Formula (50-5) below.

[Formula 56]

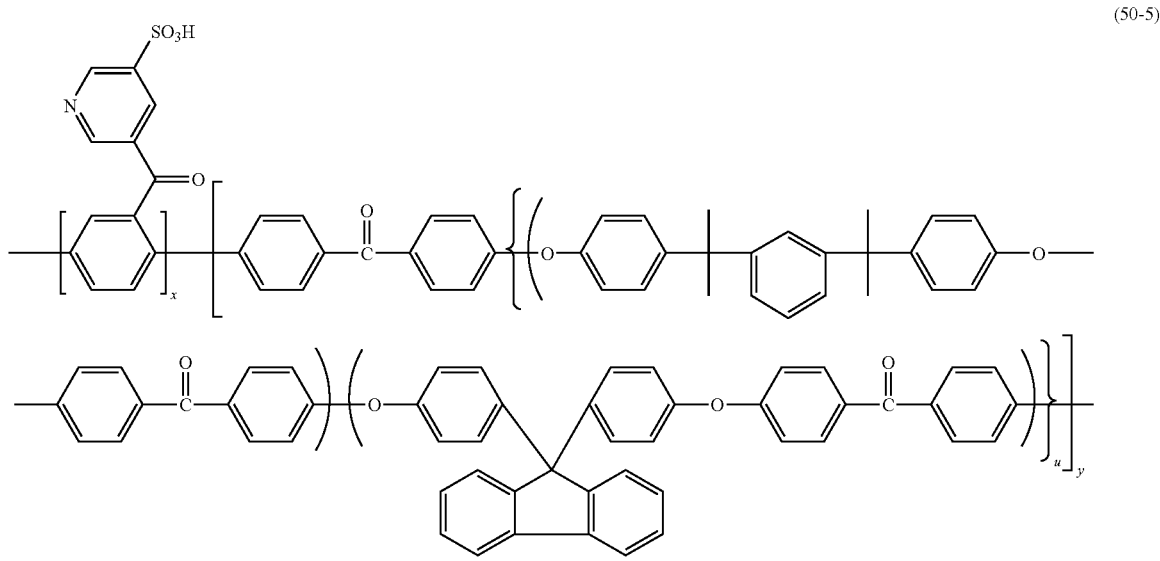

(50-5)

[Formula 57]

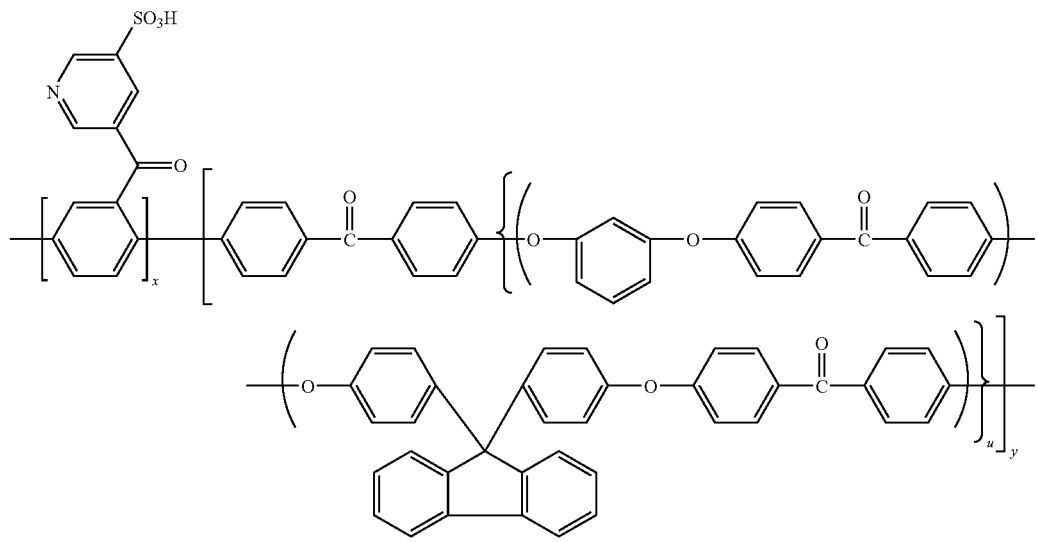

(50-6)

Comparative Example 1

The same experimental procedure as in Example 1 was performed except that 304 mL of dried DMAc was subjected to a reaction with 62.1 g (96.5 mmol) of the compound represented by Formula (60-1) below and 39.20 g (3.5 mmol) of the hydrophobic unit synthesized as Formula (30-6), under the conditions of the presence of 3.27 g (5.0 mmol) of bis(triphenylphosphine)nickel dichloride, 10.49 g (40 mmol) of triphenylphosphine, 0.45 g (3.0 mmol) of sodium iodide, and 15.69 g (240 mmol) of zinc.

[Formula 58]

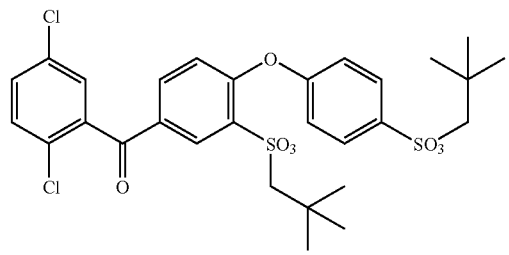

(60-1)

The measurement of molecular weights of the resulting polymer by GPC showed an Mn of 57000 and an Mw of 165000. The ion-exchange capacity was 2.26 meq/g. The resulting polymer was represented by Formula (60-2) below.

[Formula 59]

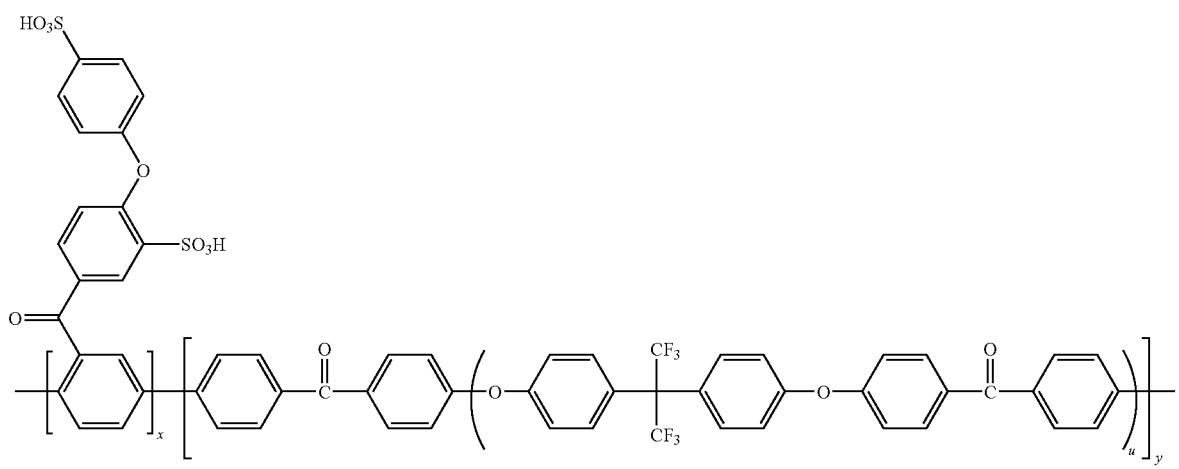

(60-2)

Table 1 shows characteristics of the sulfonated polymers produced in Examples 1 to 12 and Comparative Example 1.

TABLE 1

| | Polymer properties | | | Mechanical properties | | | | Heat resistance test | |
| --- | --- | --- | --- | --- | --- | --- | --- | --- | --- |
| | Mn | Mw | Sulfonic acid equivalent Meq/g | Rupture strength MPa | Elongation % | Elasticity GPa | Proton conductivity S/cm | Change in molecular weight | Insoluble fraction % |
| Example 1 | 53000 | 105000 | 2.28 | 105 | 41 | 3.1 | 0.26 | No change | 0 |
| Example 2 | 41000 | 84000 | 2.30 | 99 | 40 | 3.2 | 0.31 | No change | 0 |
| Example 3 | 39000 | 88000 | 2.29 | 101 | 38 | 3.9 | 0.30 | No change | 0 |
| Example 4 | 29000 | 63000 | 2.27 | 108 | 42 | 3.4 | 0.29 | No change | 0 |
| Example 5 | 32000 | 54000 | 2.26 | 95 | 35 | 3.5 | 0.28 | No change | 0 |
| Example 6 | 40000 | 73000 | 2.27 | 99 | 37 | 3.6 | 0.29 | No change | 0 |
| Example 7 | 45000 | 93000 | 2.28 | 103 | 41 | 3.3 | 0.32 | No change | 0 |
| Example 8 | 32000 | 60000 | 2.27 | 112 | 37 | 3.1 | 0.31 | No change | 0 |
| Example 9 | 34000 | 67000 | 2.26 | 110 | 40 | 3.0 | 0.29 | No change | 0 |
| Example 10 | 33000 | 70000 | 2.25 | 106 | 60 | 3.4 | 0.30 | No change | 0 |
| Example 11 | 42000 | 81000 | 2.29 | 102 | 72 | 3.1 | 0.32 | No change | 0 |
| Example 12 | 32000 | 66000 | 2.26 | 111 | 45 | 3.1 | 0.33 | No change | 0 |
| Comparative Example 1 | 57000 | 165000 | 2.26 | 110 | 40 | 2.8 | 0.30 | Significant change | 80 |

The invention claimed is:

1. A polyarylene copolymer having a sulfonic acid group, the polyarylene copolymer comprising a repeating unit represented by formula (2):

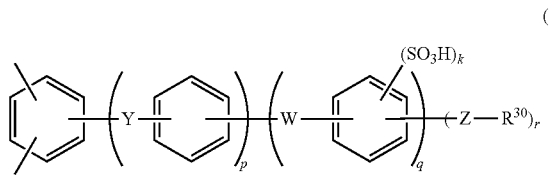

(2)

wherein
Y is at least one structure selected from the group consisting of —CO—, —SO$_2$—, —SO—, —CONH—, —COO—, —(CF$_2$)$_l$— (l is an integer of 1 to 10), and —C(CF$_3$)$_2$—;
W is at least one structure selected from the group consisting of a direct bond, —CO—, —SO$_2$—, —SO—, —CONH—, —COO—, —(CF$_2$)$_l$— (l is an integer of 1 to 10), —C(CF$_3$)$_2$—, —O—, and —S—;
Z is a direct bond or at least one structure selected from the group consisting of —(CH$_2$)$_l$— (l is an integer of 1 to 10), —C(CH$_3$)$_2$—, —O—, —S—, —CO—, and —SO$_2$—;
R$^{30}$ is a nitrogen-containing heterocycle having at least one substituent selected from the group consisting of —SO$_3$H, —O(CH$_2$)$_h$SO$_3$H, and —O(CF$_2$)$_h$SO$_3$H (h is an integer of 1 to 12), wherein the nitrogen-containing heterocycle is selected from the group consisting of pyrrole, thiazole, isothiazole, oxazole, isoxazole, imidazole, imidazoline, imidazolidine, pyrazole, 1,3,5-triazine, pyridine, pyrimidine, pyridazine, pyrazine, indole, quinoline, isoquinoline, burine, tetrazole, tetrazine, triazole, carbazole, acridine, quinoxaline, quinazoline, indolizine, isoindole, 3H-indole, 2H-pyrrole, 1H-indazole, purine, phthalazine, naphthyridine, cinnoline, pteridine, carboline, phenanthridine, perimidine, phenanthroline, phenazine, phenarsazine, phenothiazine, furazan, phenoxazine, pyrrolidine, pyrroline, pyrazoline, pyrazolidine, piperidine, piperazine, indoline, isoindoline, and quinuclidine;
p is an integer of 0 to 10;
q is an integer of 0 to 10;
r is an integer of 1 to 5; and
k is an integer of 0 to 4;
the polyarylene copolymer further comprising a structure represented by Formula (3):

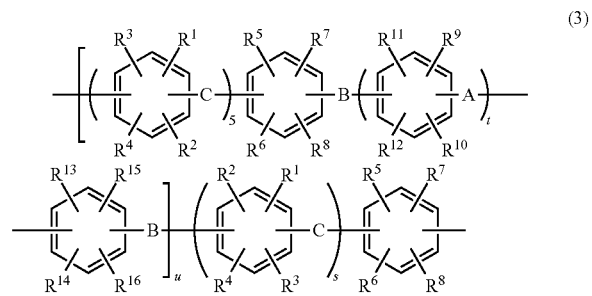

(3)

wherein
each A and C independently denotes a direct bond or at least one structure selected from the group consisting of —CO—, —SO$_2$—, —SO—, —CONH—, —COO—, —(CF$_2$)$_l$— (l is an integer of 1 to 10), —C(CF$_3$)$_2$—, —(CH$_2$)$_l$— (l is an integer of 1 to 10), —C(CR'$_2$)$_2$— (R' is a hydrocarbon group or a cyclic hydrocarbon group), —O—, and —S—;
each B independently denotes an oxygen atom or a sulfur atom;
R$^1$ to R$^{16}$ may be the same or different from one another and each denote at least one atom or group selected from the group consisting of hydrogen atoms, fluorine atoms, alkyl groups, halogenated alkyl groups that are partially or fully halogenated, allyl groups, aryl groups, nitro groups, and nitrile groups;
s and t each denote an integer of 0 to 4; and
u denotes 0 or an integer of 1 or more.

2. The copolymer according to claim 1, wherein Y denotes —CO— or —SO$_2$—; W and Z each denote a direct bond, —CO—, —SO$_2$—, —O—, or —S—; p and q is each from 0 to 2; and r is from 1 to 2.

3. The copolymer according to claim 1, wherein Y denotes —CO— or —SO$_2$—; W and Z each denote a direct bond, —CO—, —SO$_2$—, —O—, or —S—; p and q is each from 0 to 2; r is from 1 or 2; and R$^{30}$ denotes a derivative derived from a compound selected from the group consisting of pyridine, imidazole, and triazole each having at least one substituent represented by —SO$_3$H, —O(CH$_2$)$_h$SO$_3$H, or —O(CF$_2$)$_h$SO$_3$H (h is an integer of 1 to 12), and derivatives thereof.

4. A polymer electrolyte composed of the polyarylene copolymer according to claim 1.

5. The polymer electrolyte according to claim 4, the polymer electrolyte having an ion-exchange capacity of 0.5 to 3 meq/g.

* * * * *